3,668,623
Date: June 6, 1972

United States Patent
Csaposs

[54] AIRCRAFT VERTICAL FLIGHT POSITION DISPLAY INSTRUMENT

[72] Inventor: James Csaposs, Maywood, N.J.
[73] Assignee: The Bendix Corporation
[22] Filed: Aug. 14, 1969
[21] Appl. No.: 850,161

[52] U.S. Cl. ........................................340/27 NA, 343/108
[51] Int. Cl. ..........................................................B64d 45/00
[58] Field of Search ..................340/24, 27 NA; 343/112 PT, 343/108; 235/150.26, 150.27

[56] References Cited

UNITED STATES PATENTS

| | | | |
|---|---|---|---|
| 2,528,142 | 10/1950 | Herzlinger | 340/24 UX |
| 3,398,267 | 8/1968 | Hattendorf | 343/108 |
| 3,449,713 | 6/1969 | Kaiser | 340/27 |
| 3,478,310 | 11/1969 | Cone, Jr. | 340/27 |
| 3,505,640 | 4/1970 | Cohen | 340/24 |

FOREIGN PATENTS OR APPLICATIONS

| | | | |
|---|---|---|---|
| 543,638 | 3/1942 | Great Britain | 343/108 |

*Primary Examiner*—Kathleen H. Claffy
*Assistant Examiner*—Jan S. Block
*Attorney*—Herbert L. Davis and Plante, Hartz, Smith and Thompson

[57] ABSTRACT

An aircraft instrument for providing a pictorial display of a vertical plane position of an aircraft, helicopter or other space operated vehicle in flight in relation to radio navigation aids or other selected reference points on the ground or in space. The instrument utilizes a computing device to establish the location of the references with respect to the vehicle in flight and the vertical pictorial display portrays the vehicle as a moving symbol, such as a red dot of light or other indicator means, positioned on a grid in a manner that shows the actual vehicle altitude above or below the reference point, distance of the vehicle from a reference point, and the vertical plane angle which would lead directly to the reference point.

The instrument also includes means to provide a display of a selected or computed angular path to the same reference point so that an observer may readily determine whether the vehicle is following a proper flight path or whether it is possible to follow the proper path from the vehicle's present position in flight. Additional means are also provided in the instrument to display the relative vertical plane position of another reference point, on the ground or in space in relation to the same vertical plane by portraying the second reference point at another symbol, such as a blue dot of light or other suitable indicator means on the same grid.

In the aforenoted instrument the relationships between the elements of the display is established so as to correspond to a mental image such as may be usually maintained by the pilot of the vehicle as he operates the vehicle in flight. In such manner the display serves to correlate and update the pilot's mental image with a minimum of confusion or interruptive mental action as the vehicle may rise or descend using vertical aimpoints or references.

41 Claims, 8 Drawing Figures

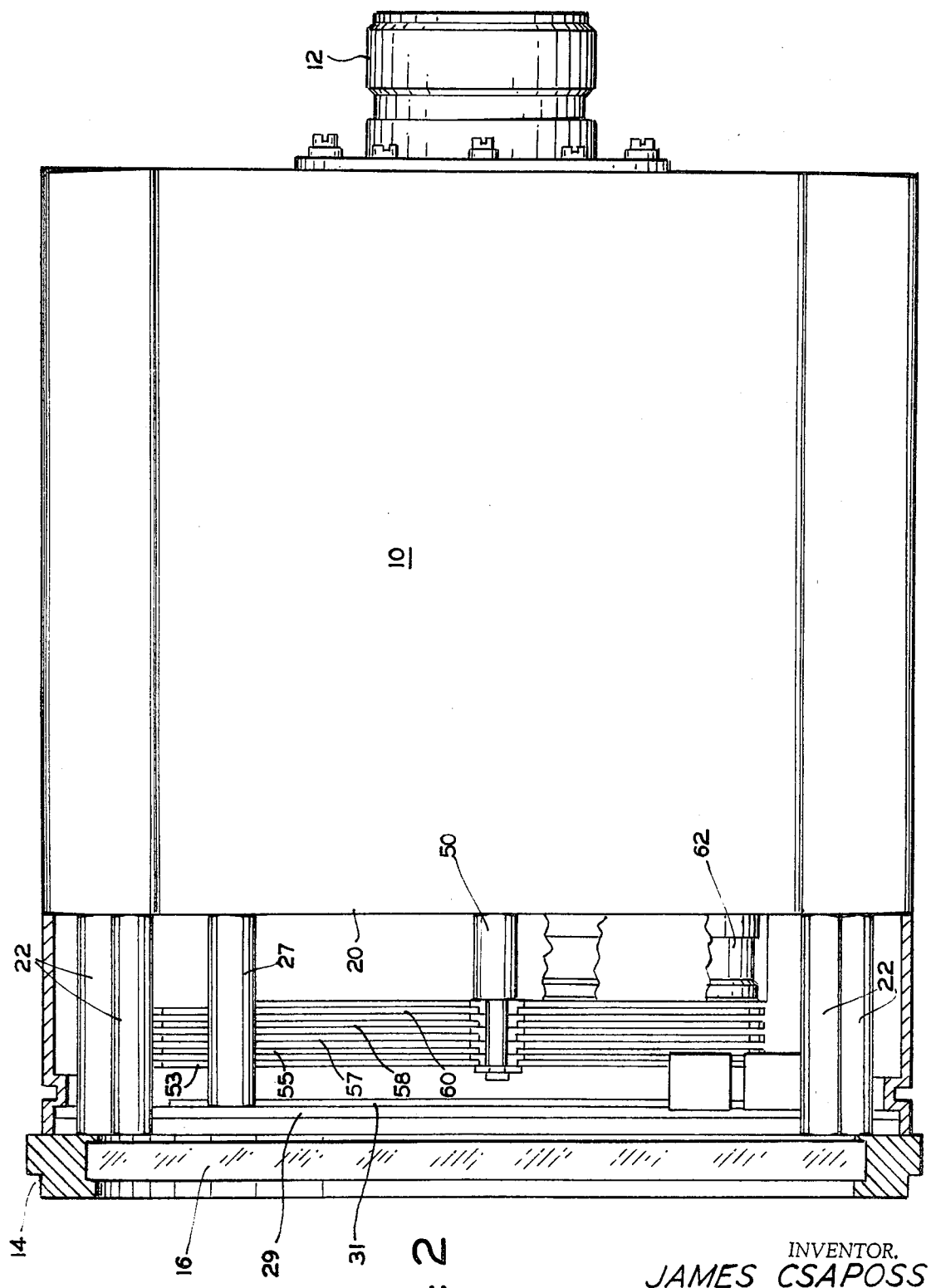

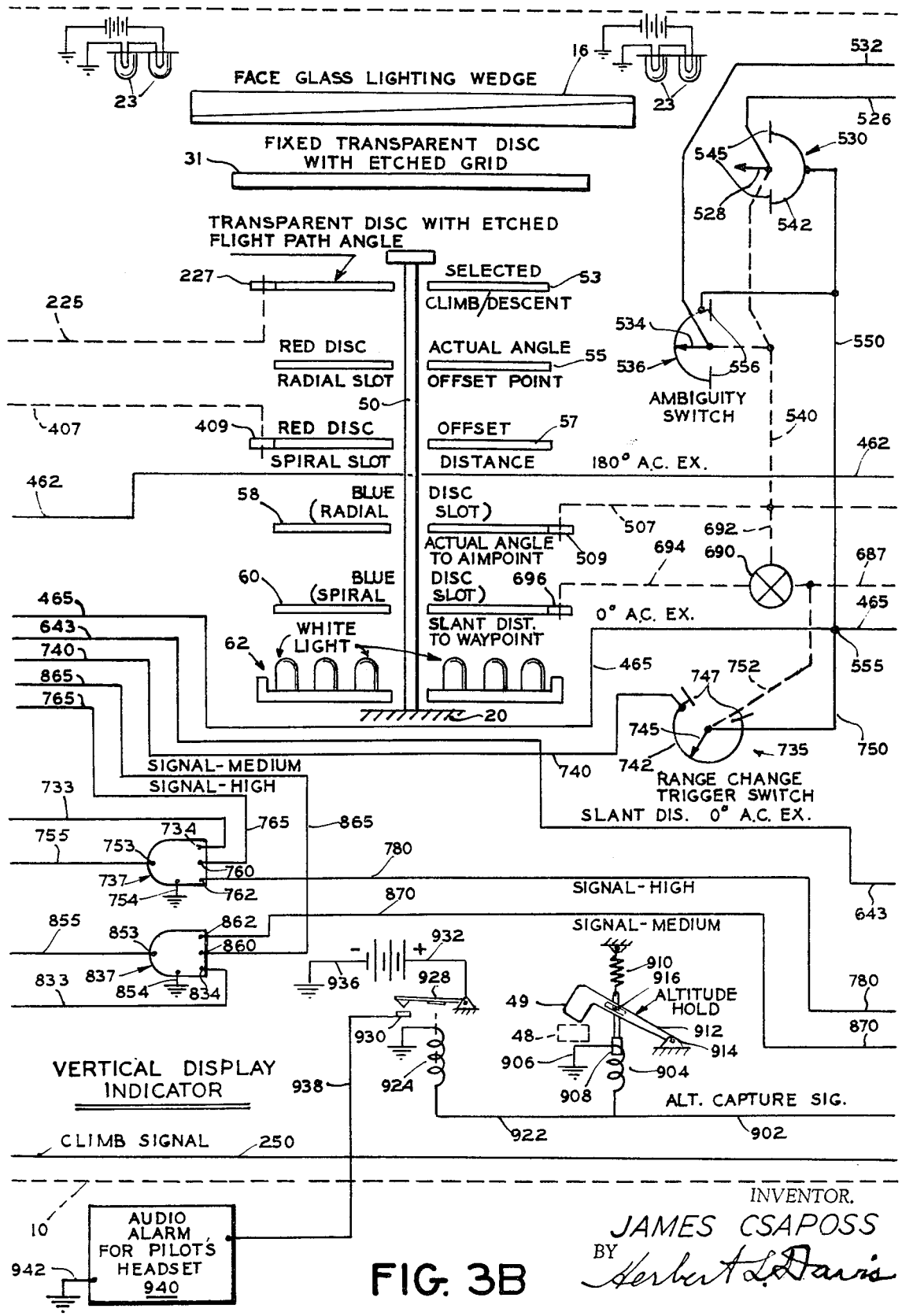

INVENTOR.
JAMES CSAPOSS
BY Herbert L. Davis
ATTORNEY

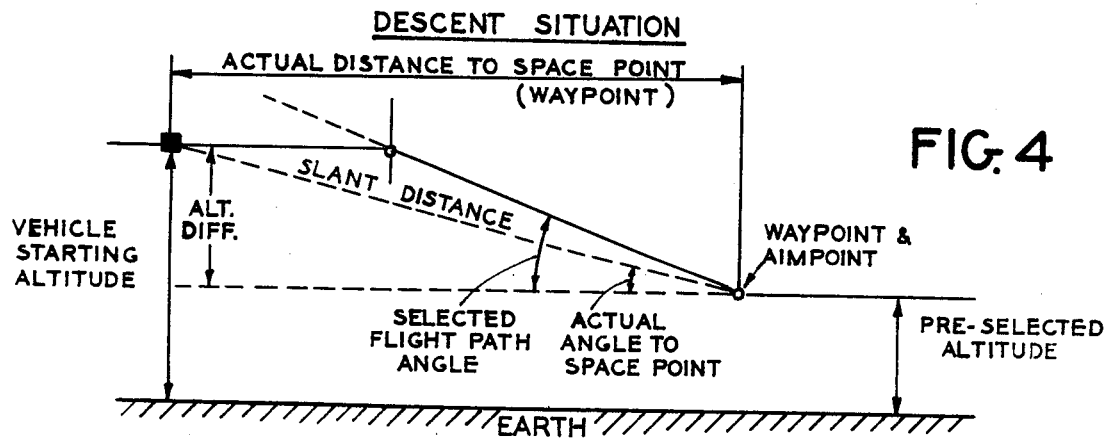
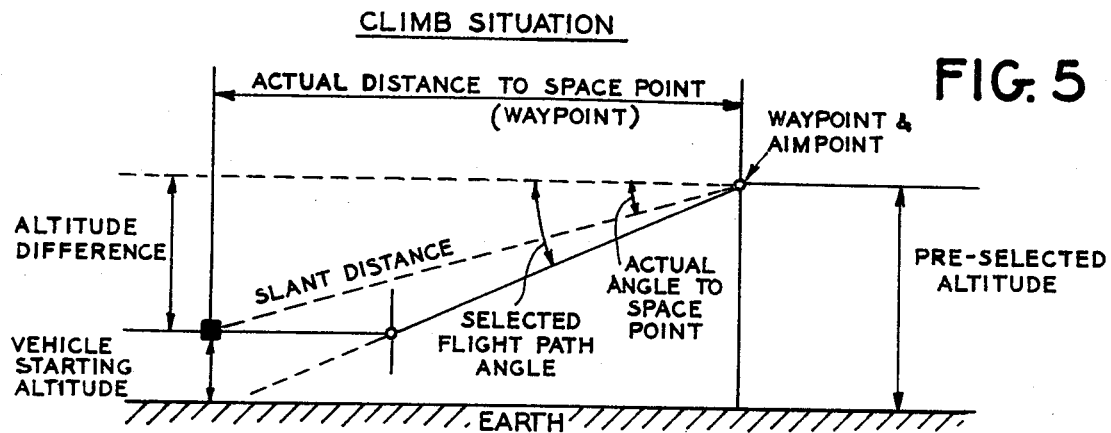
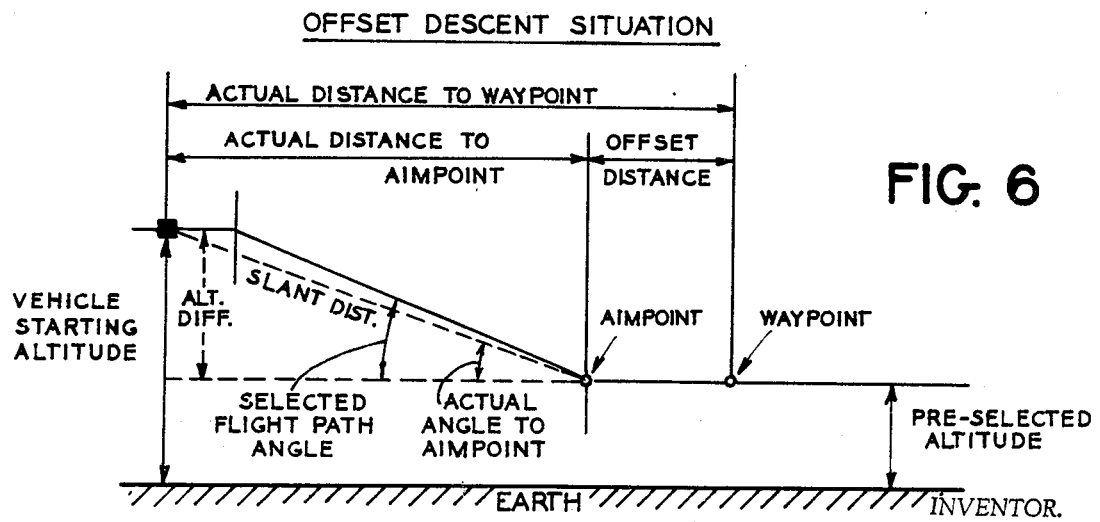

3,668,623

AIRCRAFT VERTICAL FLIGHT POSITION DISPLAY INSTRUMENT

CROSS REFERENCE TO A RELATED APPLICATION

The present application relates to an improved compact display instrument of a type such as described and claimed in a copending U. S. application, Ser. No. 548,550 filed May 9, 1966 by Richard L. Cohen for AN AIRCRAFT FLIGHT POSITION DISPLAY INSTRUMENT, now U.S. Pat. No. 3,505,640, granted Apr. 7, 1970 to Richard L. Cohen and assigned to The Bendix Corporation, assignee of the present invention.

BACKGROUND OF THE INVENTION

1. Field of the Invention

This invention relates to a field in which increasing traffic congestion of certain air spaces near principle airports and the requirements for more accurate control of aircraft vertical operations to improve performance have led to a need for systems to provide more comprehensive vertical control of air-borne vehicles. In order to maintain proper control, monitor automatic flight control systems and operate more efficiently in control zones, it is necessary that the operator know the vehicle's present position, intended flight path, progress at all times and its capability to conform to a controller's request. Although heretofore many pictorial and map displays have been developed for portraying the horizontal position of an aircraft in flight over the earth's surface, an entirely satisfactory means for displaying the vertical location and path of such a flying vehicle has not been produced. The aircraft vertical flight position display instrument of the present invention, satisfies this need of the operator for vertical situation information with a complete, compact and easy to interpret display presentation.

2. Description of the Prior Art

Heretofore means have been utilized to generate grid and moving spots required to display the aircraft and reference points, including the use of cathode ray tube devices with grid and symbol painting control circuits. The present invention utilizes an electro mechanical optical means of generating the moving symbols on a grid glass which may be small enough to be used on the face of an aircraft panel instrument.

In carrying out the present invention, there may be utilized an idea of means described and claimed in the aforenoted copending U.S. Pat. No. 3,505,640, granted Apr. 7, 1970 to Richard L. Cohen for generating indicating dots to represent the position of an aircraft in flight in relation to a reference point.

However the visual display instrument of the last mentioned U.S. Pat. No. 3,505,640, includes a control means for receiving distance and bearing signals from a facility for transmitting such signals to operate the display dot generating means and in no sense, suggests the control means of the present invention for providing a display of the vertical plane position of the aircraft in flight.

The use of the display dot generating means, together with the control means of the present invention, permits the instrument case to be of size that may be conveniently mounted along with other flight instruments on the instrument panel of a vehicle and which vertical display may be observed by the operator without engaging in large eye or head movements away from the primary flight instruments.

SUMMARY OF THE INVENTION

The present invention relates to a compact aircraft vertical flight position display instrument in which the relationship between a grid and reference symbol of the instrument correspond closely to a mental picture (or image) as it exists in the average pilot's mind. The display arrangement is such that it may be interpreted rapidly and accurately by a pilot without new instrument training or extensive practice in the interpretation of display data.

An object of the invention is to provide a vertical plane display instrument corresponding to the plane which passes through a vertical line erected at the horizontal reference point on the earth surface and passes through the point corresponding to the vehicle's actual position in space.

Another object of the invention is to provide a display instrument utilizing a grid in the instrument to show the relationship of a vehicle in flight to its vertical aimpoint (destination) and referenced navigation aids.

Another object of the invention is to provide a rotating or moving cursor to describe the best or desired vertical path of the vehicle in flight to a reference point.

Another object of the invention is to provide a vertical grid and a numerical display to portray the selected or directed altitude of the actual vehicle flight position in relation to the selected altitude, either above or below.

Another object of the invention is to provide moving symbols on a grid to display and calibrate the vertical plane relationship between a vehicle in flight and its intended space destination and the relationship of both to another reference such as a radio aid.

Another object of the invention is to provide grid line identifications and annunciator devices that permit changing of scales without affecting the most significant number.

Another object of the invention is to provide a two sided symmetrical grid so arranged that the display maintains a valid relationship when the aircraft has passed the reference point and has proceeded with further maneuvers such as an approach to the destination field.

Another object of the invention is to provide an idea of means such as described and claimed in the aforenoted U.S. Pat. No. 3,505,604 for generating two colored dots on an instrument display, but which idea of means as applied in the present invention is distinguished from that of the aforenoted U.S. Pat. No. 3,505,640 in that the display is effectively controlled so as to provide a continuously updated vertical picture of an aircraft or vehicle location in flight and the location of a selected reference with respect to a navigation reference such as a VORTAC station.

Another object of the invention is to provide effective horizontal and vertical scales on a grid so arranged that both may be changed together to produce a constant angular relationship for the flight path or actual angle of flight of the aircraft to an aimpoint.

Another object of the invention is to provide means to effect vertical plane angular bearing and distance to a desired vertical destination point (aimpoint) and to position an aircraft symbol on a vertical situation display.

Another object of the invention is to provide means to effect vertical plane height above or below a desired vertical destination (aimpoint) coupled with the horizontal distance from the destination and to position a vehicle symbol on a vertical situation display.

Another object of the invention is to provide means to effect an offset distance (distance between waypoint destination and aimpoint) and to position a symbol on the vertical situation display to depict an alternate reference point.

Another object of the invention is to provide means to effect an offset distance and offset altitude and to position a symbol on a vertical situation display so as to depict an alternate reference point.

Another object of the invention is to provide means to effect a vertical display so as to pictorially verify for the operator the flight path angle he has selected, the altitude he has selected, and to immediately display to the operator his capability of conforming to his selection.

Another object of the invention is to provide means of programming and displaying a selected angle of climb or descent, or by operation of a simple selection switch obtain a preselected descent angle or a cruise climb command automatically, depending on the altitude selection above or below the starting vehicle altitude.

Another object of the invention is to provide an aircraft vertical flight position display instrument in which the vertical plane displayed by the instrument is such that if the aircraft is not on a direct geometric course to the reference point, the vertical plane displayed will continuously change to correspond to the new space position of the vehicle.

Another object of the invention is to provide such a display instrument in which so long as the vehicle has a component of velocity in the direction of the reference point, the vehicle symbol will move to the right, i.e. regardless of the compass orientation of the vertical plane, the display will be operating from left to right, but the control arrangement is such that after passing the reference point, the vehicle assembly will continue to the right to maintain the same image of the vertical plane displayed.

Another object of the invention is to provide an aircraft vertical position display instrument which effects a complete, compact, easy to interpret presentation of the vertical situation information.

These and other objects and features of the invention are pointed out in the following description in terms of the embodiment thereof which is shown in the accompanying drawings.

DESCRIPTION OF THE DRAWINGS

In the drawings in which corresponding parts have been indicated by corresponding numerals.

FIG. 2 is a side view of the display instrument of FIG. 1 with certain parts broken away so as to better illustrate the instrument bezel, face mask, the grid screen, rotating cursor disc and four discs for generating the indicator light dots.

FIG. 3B illustrates diagrammatically a vertical pictorial display indicator interconnected with portions of the block diagram shown by FIGS. 3A, 3B and 3C of the electromechanical optical implementation of the display instrument of FIGS. 1 and 2.

FIG. 4 is a graphical presentation of a descent situation and the implemented geometry displayed by the instrument of the present invention under such operative conditions of the aircraft.

FIG. 5 is a graphical presentation of a climb situation and the implemented geometry displayed by the instrument of the present invention under such operative conditions of the aircraft.

FIG. 6 is a graphical presentation of an offset descent situation and the implemented geometry displayed by the instrument of the present invention under such operating conditions of the aircraft.

DESCRIPTION OF THE INVENTION

Figure 1:
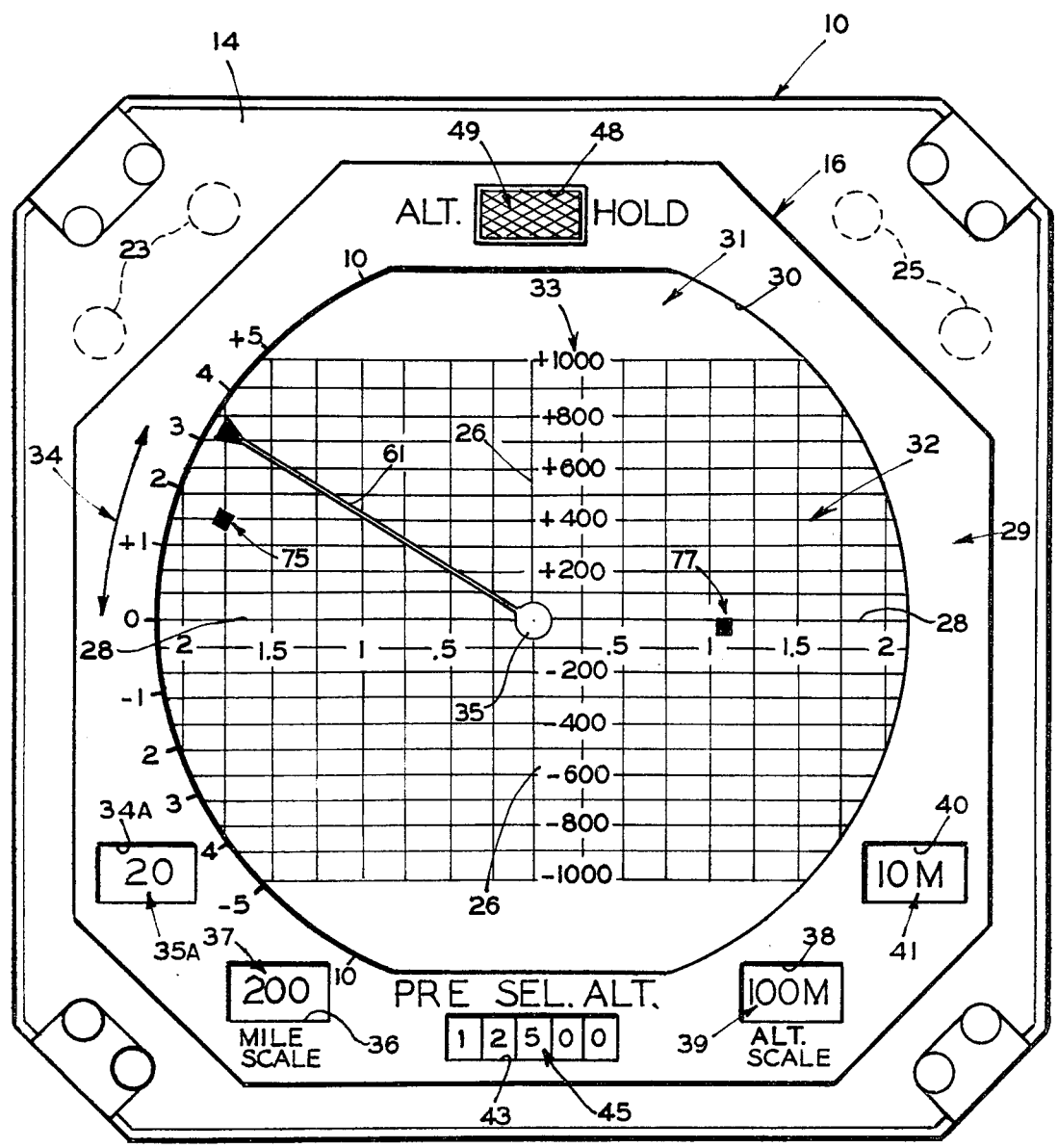
FIG. 1 is a front view of a vertical pictorial display instrument embodying the present invention and showing a fixed grid with a center reference point and scaled numbers, a moving cursor indicating a desired angular flight path, an aircraft light indicator dot, a reference station light indicator dot, a selected altitude hold flag and annunciator numbers which show the active scale of the presentation.

Referring to FIGS. 1 and 2, reference numeral 10 indicates a casing of the display instrument having a rear electrical connector 12 and a front bezel 14 and within which casing is provided the operating mechanism of the display instrument, as hereinafter explained.

The front bezel 14 includes a wedge shaped face glass 16 which seals the casing 10 while allowing a view of the internal pictorial elements and mechanisms.

Figure 3A:
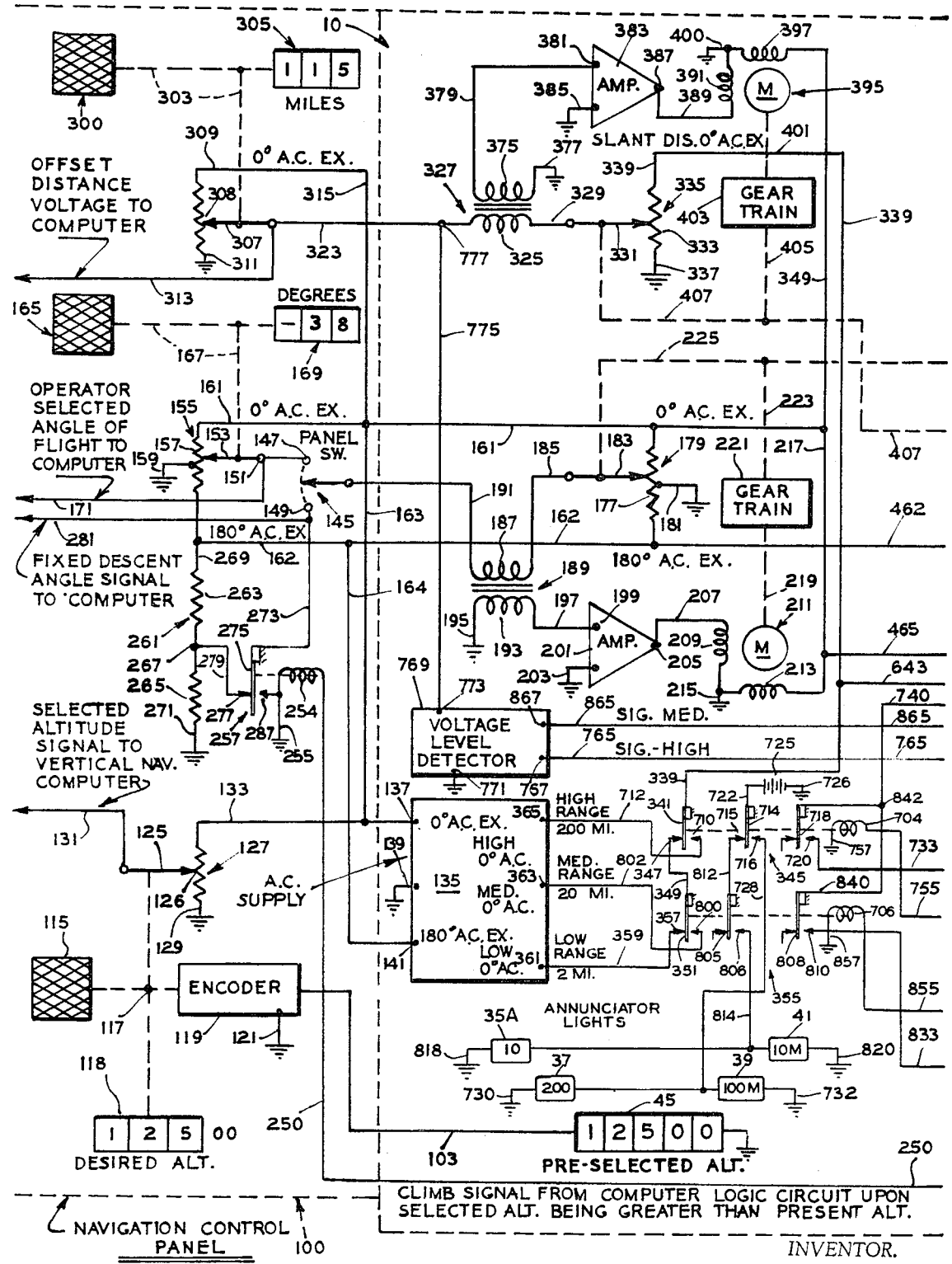
FIG. 3A illustrates diagrammatically a navigation control panel of a flight vehicle interconnected with portions of a block diagram shown by FIGS. 3A, 3B and 3C of an electromechanical optical implementation of the operative mechanism of the display instrument of FIGS. 1 and 2.
Figure 3C:
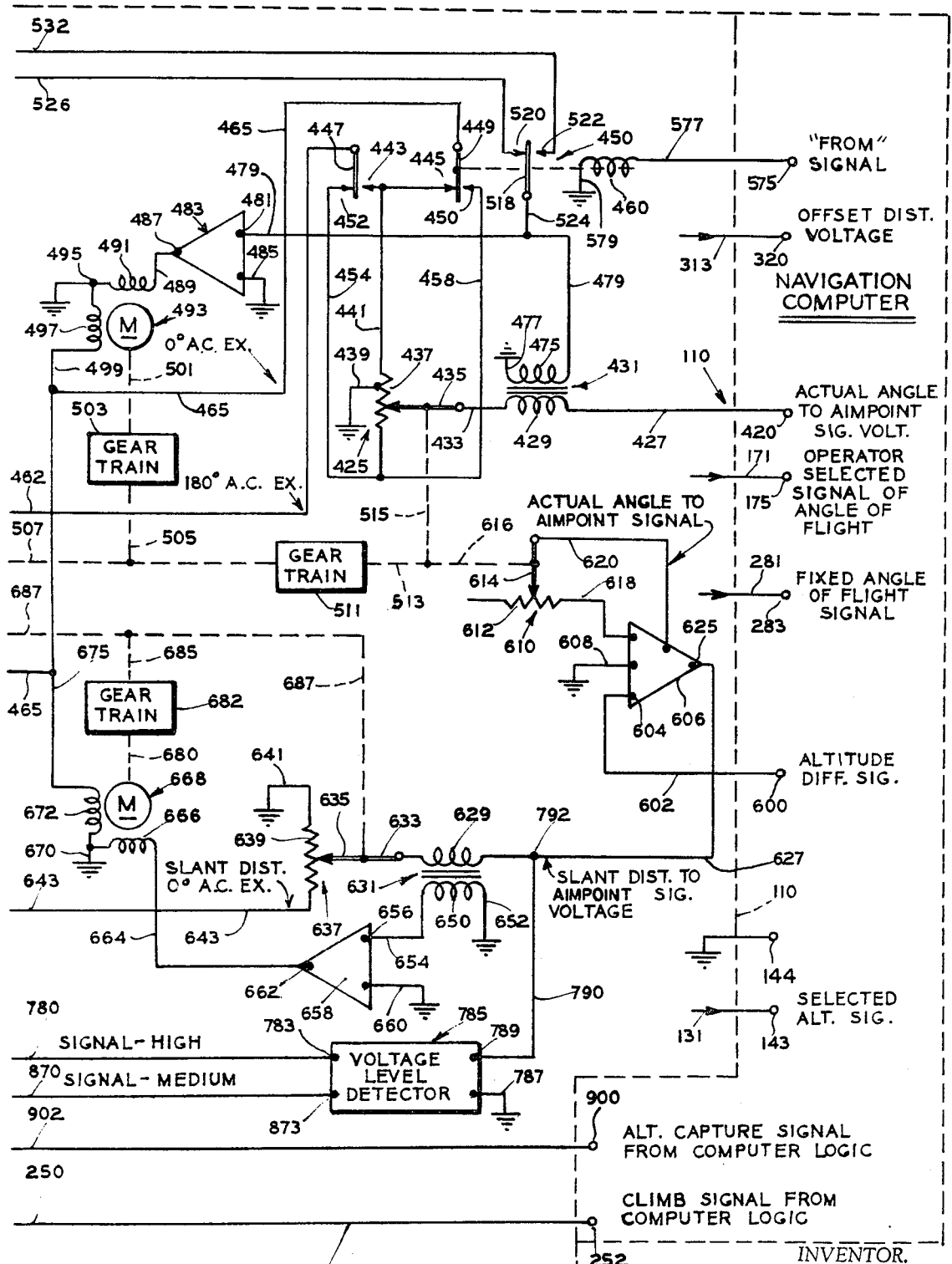
FIG. 3C illustrates diagrammatically a navigation computer of a flight vehicle interconnected with portions of the block diagram shown by FIGS. 3A, 3B and 3C of the electromechanical implementation of the display instrument of FIGS. 1 and 2.

The operating mechanism of the display instrument of FIGS. 1 and 2, including the gearing and electromechanical servo elements shown diagrammatically in FIGS. 3A, 3B and 3C, are contained within the casing 10 and attached by a mechanism plate 20 and mounting posts 22 to the bezel 14, as a complete assembly, as best shown in FIG. 2.

The electronic elements shown diagrammatically in FIGS. 3A, 3B and 3C are mounted behind the mechanism and within the casing 10 and further are connected by suitable electrical conductors to the mechanism and face elements, as shown by the broken away portions of FIG. 2.

As best shown in FIG. 1, at the two upper corners of the bezel 14 are light wells which contain small electrical bulbs 23 and 25 for illuminating the face glass 16 by reflection off of wedge tapered surfaces of the face glass 16 in a conventional manner, as illustrated diagrammatically in FIG. 3B.

Further fixed to the mechanism plate 20 by suitable mounting posts, one of which is indicated in FIG. 2 by the numeral 27, is an opaque mask 29 having an opening 30 therein. Fastened directly behind the mask 29 and exposed through the opening 30 is a clear glass disc 31 which is secured to the mask 29 by suitable means to provide a display plate.

The clear glass disc 31 has a grid 32 and grid scales 33 etched on its surface as well as an instrument center point 35 representing the aimpoint, a horizontal grid center line 28 which extends from the left and right sides of the center point 35, and a grid vertical center line 26 which extends from above and below the center point 35. These indicia show through the face glass 16 and the opening 30 in the opaque mask 29, as shown in FIG. 1. The flight path angle index 34 and other numerical symbols and letterings are painted on the surface of the opaque mask 29 and are also viewable through the face glass 16, as best shown in FIG. 1.

Windows 34A, 36, 38 and 40 are provided in the mask 29 to allow viewing therethrough of annunciator lights 35, 37, 39 and 41 which are fastened to the back of the mask 29. Illumination of these lights may be effectively controlled, as shown diagrammatically in FIG. 3A.

A window 43 is also provided at the lower portion of the mask 29 so that numerical lamps 45 may be selectively illuminated so as to display therethrough a selected altitude, as hereinafter explained with reference to the diagrammatic drawing of FIG. 3A. Shown at the top of the mask 29 is another window 48 through which may be viewed an altitude hold flag spade 49 which may be actuated so that it either shows through the window 48 or disappears from view by the operation of suitable electromagnetic actuating means, as hereinafter explained with reference to the diagrammatic view of FIG. 3B.

Furthermore a shouldered shaft 50 is mounted on the mechanism plate 20, as shown in FIG. 2, in a position in alignment with the center point 35 of the grid 32 etched on the clear plate 31, as indicated in FIG. 1. Suitable glass discs 53, 55, 57, 58 and 60 are freely mounted on reduced diameters of the shaft 50, as best shown in FIG. 2.

Each disc has a metal bearing fastened into a center hole and a rim gear fastened to its outer edge, and while disc 55, as shown in FIG. 3B, is initially fixedly positioned, the remaining discs 53, 57, 58 and 60 are free to be rotated independently of each of the other discs. The discs 53, 57, 58 and 60 are in mesh with drive pinions, as shown diagrammatically by FIG. 3B, which in turn are mounted on shafts which extend out from the operating mechanism. These shafts extend through the mechanism plate 20 of FIG. 2 so that each of these discs may be rotated to various positions determined by the operating mechanism.

The front disc 53 is formed of a clear glass and has a flight path cursor line 61, etched along a radial line from the center of the disc 53 which corresponds to the center line of the shaft 50 in alignment with the center point 35 etched on the clear glass disc 31 and viewable through the window 16, as shown by FIG. 1. The discs 55, 57, 58 and 60 may be physically constructed in a like manner to that of the red and blue colored discs arranged as heretofore described and claimed in the aforenoted U.S. Pat. No. 3,505,640. The discs 55, 57, 58 and 60 may be provided in a somewhat similar arrangement to effect an aircraft position indicator dot 75 and waypoint indicator dot 77.

Moreover immediately behind the last rotating glass disc 60 is located a light cup 62 carrying several incandescent electric light bulbs which may be suitably illuminated as indicated diagrammatically in FIG. 3B. The cup is of a size corresponding to the disc 60 and has a hole in the center to allow the shaft 50 to pass therethrough. The shaft 50 is fastened to the mechanism plate 20.

The discs 55 and 57 may be formed of a suitable colored glass, such as a red glass, with a suitable radial slot being provided in the disc 55 and a suitable Archimedian spiral slot being provided in the disc 57.

The discs 58 and 60 may be formed of a suitable different colored glass, such as a blue glass; with a suitable radial slot being provided in the disc 58 and a suitable Archimedian spiral slot being provided in the disc 60.

The operative arrangement of the discs 55, 57, 58 and 60 is such that a variably positioned beam of light indicative of the flight position of the vehicle or aircraft is viewable on the grid 32 through the window 16 of the display instrument as a red dot 75, as shown by way of example by FIG. 1.

The red dot 75 indicative of the vehicle or aircraft position is produced on the face of the instrument when the white light from the light cup 62 passes through the intersection of the clear Archimedian spiral slot of blue disc 60 and the clear radial slot of blue disc 58 and then in turn passes through the red colored portions of red disc 57 and red disc 55. The observer at the front of the instrument sees the beam formed by the intersection of the slots as a bright red dot 75 which is the same shape as the geometric shape formed by the lines defining the sides of the clear spiral slot in the blue disc 60 and the clear radial slot in the blue disc 58. Light that passes through the colored portion of one or both blue discs as well as both red discs is very dim in contrast with the light which has passed through the clear portions of the blue disc and the colored portion of both red discs as in the disclosure of the aforenoted U.S. Pat. No. 3,505,640.

Thus the red dot 75 may be effectively generated by the adjusted positions of the discs 58 and 60.

On the other hand in those cases in which the waypoint, as indicated graphically by FIG. 6, is different from that of the aimpoint 35, the position of the waypoint is indicated on the grid 32 of the display instrument by a beam of light which passes through the portion of the spiral slot in the red colored disc 57 which coincides with the radial slot in the red disc 53, so that a portion of the white light passing through the blue discs 60 and 58 will then pass through the small clear opening formed by the intersections of the slots of the discs 57 and 55 and will appear to the observer at the front of the device to be a blue dot 77 of light on the grid 32 with a geometric shape defined by the edges of the radial slot in the red disc 55 and the spiral slot in the red disc 57. The remaining blue light passing through the red colored discs 55 and 57 will be filtered until it is dim in comparison to the blue dot 77 indicative of the waypoint.

The operating mechanism for the display instrument, as shown diagrammatically in FIGS. 3A, 3B and 3C, include conventional gears, differentials, shafts, bearings, motors and rotating potentiometers to provide the four servo systems to position the light dot control discs 57, 58 and 60, as well as the cursor line control disc 53 in response to functional signals for angular bearings and distances representing the vertical position location of the vehicle or aircraft in flight and relative location of the navigation aids or reference points.

OPERATING MECHANISM OF FIGS. 3A, 3B and 3C

The operating mechanism for the display instrument 10 of FIGS. 1 and 2, as shown diagrammatically in FIGS. 3A, 3B and 3C, includes a navigation control panel 100 operatively connected to a navigation computer 110 and to the display instrument 10 which is in turn operatively connected between the control panel 100 and computer 110.

The navigation computer 110 may be of a conventional type or the computer 110 may include a system for controlling an aircraft to attain a predetermined altitude such as described and claimed in a U.S. Pat. No. 3,545,703, granted Dec. 8, 1970 to Jerry Doniger and Joseph H. McLaughlin on a U.S. application, Ser. No. 679,757, filed Nov. 1, 1967 and assigned to The Bendix Corporation.

In the operation of the foregoing display instrument 10, an operator or pilot of an aircraft carrying the display instrument, determines a point in space (waypoint) that he intends to use as a destination point (see the graphical illustrations of FIGS. 4, 5 and 6).

In order to determine this destination point with respect to the display instrument 10, the operator defines its location in space in terms of altitude above ground level, indicated graphically in the FIGS. 4, 5 and 6 by the legend pre-selected altitude. The pilot or operator selects the navigation fix (radio station or ground point) which he intends to approach. A navigation computer (not part of this invention) by conventional geometric computing means determines the actual distance from the vehicle in flight to the space point and the actual angle to the space point, as indicated by the legends of FIGS. 4, 5 and 6, and further the operator determines the vertical path along which he wishes to approach the waypoint in the flight of the aircraft in terms of the selected flight path angle as indicated by such legends on the graphical illustration of FIGS. 4, 5 and 6. Thus it will be seen that the horizontal path is the pilot's selected flight "track" and the vertical path is the pilot's selected "flight path angle".

In the type of system herein described, a point on the earth's surface corresponding to that of the waypoint may in effect be a VORTAC navigation transmitter of conventional type, a VORTAC transmitter, or a point defined by an airborne inertial platform or navigation computer of types well known in the art. Moreover other conventional means, such as a course line computer of a type well known in the art, may be utilized to compute the horizontal distance and true bearing of this point on the earth's surface.

Referring now to FIGS. 1, 3A, 4, 5 and 6 the vertical situation of the waypoint in space is set up for display on the instrument 10 by the operator selecting the desired altitude of the space or waypoint by an appropriate adjustment of an altitude selector knob 115 provided on the navigation control panel 100. The altitude selector knob 115 is mechanically connected by suitable operating means 117 to an altitude counter 118 of conventional type provided on the control panel 100. The counter 118 is adjusted then by an operator adjustment of the knob 115 so as to read the desired altitude of the waypoint.

Such adjustment of the knob 115 simultaneously effects a corresponding adjustment through the operating means 117 of an encoder 119 of conventional type and arranged to convert the altitude displayed by the counter 45 to a BCD code for each digit. These electrical digit code signals are applied by the encoder 119 through a grounded output conductor 121 and through an output conductor 123 connected across an input to a numerical lamp device 45 also of a conventional type and arranged to repeat (reproduce) the numbers displayed by the counter 118.

There is also operatively connected to the altitude selector knob 115 by the operating means 117 an arm 125 variably contacting a resistor element 126 of an analog device or potentiometer 127 arranged to produce across a grounded input-output conductor 129 and an output conductor 131 leading from the arm 125 an electrical output signal which is proportional to the altitude selected by the operator-operative adjustment of the knob 115. The variable resistor element 126 of the potentiometer 127 is connected by the grounded input conductor 129 and an input conductor 133 across a source of alternating current 135 (, i.e. output terminal 137 and grounded terminal 139 thereof). The alternating current applied across the terminals 137 and 139 is of a phase which lags by 180° a phase of an alternating current of like frequency supplied by the same source 135 across output terminals 139 and 141.

The alternating current signal voltage applied then across the output conductors 129 and 131 of the potentiometer 127 is transmitted to input terminals 143 and 144 of the navigation computer 110, shown diagrammatically by FIG. 3C. This signal voltage is utilized in the computer 110 to provide control signals to operate suitable means to control the flight of the aircraft. The computer 110 may be of a type for controlling flight of an aircraft to attain a predetermined altitude and may be of a conventional type or of a type such as described and claimed in the aforenoted U.S. Pat. No. 3,545,703.

The electrical signal proportioned to the selected altitude applied across the input terminals 143 and 145 of the navigation computer 110 is compared in the computer 110 to a voltage signal corresponding to the actual altitude of the aircraft in flight and to another voltage signal corresponding to the distance of the selected point on the earth's surface obtained from a horizontal computer. From this geometric comparison (see the graphical illustrations of FIGS. 4, 5 and 6) three factors for use by the display instrument are derived; (1) the difference in altitude between the desired altitude and the actual altitude of the aircraft; (2) the actual angle to the aimpoint or space point which may be positive or negative; and (3) a climb signal in the event the selected altitude is above the actual or prevailing altitude of the aircraft in flight, as will be explained hereinafter in greater detail.

Flight Path Angle

In the system herein described, the operator in the selection of the flight path angle has two choices provided for control of the vehicle and these in turn effect the operation of the display instrument 10. These choices may be effected by the operator setting of a selector switch 145 provided on the navigation control panel 100 and selectively operated by the operator, as hereinafter described, so that the operator may select the angle at which it is desired to climb or descent, or there may be alternately effected operation of a preselected descent angle or a preselected cruise climb control effected by computer means based on flight parameters such as airspeed and/or mach number.

It will be seen from the diagrammatic view of FIG. 3A that the operator may selectively position the switch 145 so as to alternately open and close switch contacts 147 and 149. The switch contact 147 is connected by an electrical conductor 151 to an arm 153 of a potentiometer 155 having a resistor element 157 adjustably contacted by the potentiometer arm 153. The adjustable resistor 157 has a grounded center tap 159, one end of the resistor element 157 is connected by a conductor 161 to the electrical conductor 163 leading to the terminal 137 of the source of alternating current 135, while an opposite end of the resistor element 157 is connected by a conductor 162 and 164 to the terminal 141 of the source of alternating current 135. The source 135 applies an alternating current voltage across the grounded center tap 159 and the conductor 161 of a phase which lags by 180° the phase of the alternating current voltage applied across the terminals 139 and 141 of the source of alternating current 135. Both alternating current voltages being of a like frequency.

The arm 153 of the potentiometer 155 is adjustably positioned in relation to resistor 157 and selectively at opposite sides of the grounded center tap of the potentiometer 155 by an operator-operative flight angle selector knob 165. The knob 165 is drivingly connected through suitable means 167 to the adjustable potentiometer arm 153 and a counter mechanism 169 of a conventional type arranged to show the positive or negative flight path angle desired dependent upon the adjustment of arm 153 in relation to the grounded center tap 159. The adjustable arm 153 of the potentiometer 155 is thus operatively connected by the means 167 to the flight angle selector knob 165 and the counter 169.

The arrangement is such that the potentiometer 155 produces an output voltage proportional to the position of the counter 169 as effected by the operation of the flight angle selector knob 165 by the operator. The flight angle output voltage of a selected phase and magnitude is applied across the grounded output conductor 159 and a conductor 171 leading from the output conductor 151 of the potentiometer 155 to a input terminal 175 of the navigation computer 110, as shown by FIG. 3C.

This voltage applied at the input terminal 175 of the navigation computer 110 is utilized by suitable means provided in the navigation computer 110 to compute control signals applied to suitable control means of the aircraft to cause the aircraft to follow a selected flight path in a conventional manner.

Further there is connected across the conductors 161 and 162 leading from the opposite ends of the resistor element 157 of the potentiometer 155 a second resistor element 177 of a potentiometer 179 having a grounded center tap 181. The potentiometer 179 has an adjustable potentiometer arm 183 arranged to variably contact the resistor element 177. The potentiometer arm 183 is electrically connected by a conductor 185 to one terminal of a primary winding 187 of a coupling transformer 189 while an opposite terminal of the winding 187 is connected by a conductor 191 to the switch arm 145. Thus upon the switch arm 145 closing the contact 147 the conductor 191 will in turn be connected through conductor 151 to the potentiometer arm 153 which variably contacts the resistor element 157 of the potentiometer 155.

It will be seen from the foregoing arrangement, as shown diagrammatically by FIG. 3A, that the potentiometers 155 and 179 provide a balancing bridge circuit effective upon the switch arm 145 closing the contact 147 to apply upon the potentiometers 155 and 179 being in an unbalanced relation, an alternating current voltage through the primary winding 187 which output voltage will be induced through the coupling transformer 189 to a secondary winding 193 thereof. The secondary winding 193 has one end grounded at 195 and an opposite end connected through a conductor 197 to an input terminal 199 of a servo amplifier 201 of a conventional type having a grounded input-output terminal 203.

Further an output terminal 205 of the amplifier 201 is connected through a conductor 207 to one terminal of a control winding 209 of a conventional two phase servomotor 211. The servomotor 211 has a fixed phase winding 213 having one terminal thereof connected together with a terminal of the control winding 209 to a grounded conductor 215. An opposite terminal of the fixed phase winding 213 is connected through a conductor 217 to the conductor 161 which in turn leads through the conductor 163 to the output terminal 137 of the source of alternating current 135.

The servomotor 211 drives through an output shaft 219, gear train 221 and shaft 223, a shaft 225 which is in turn drivingly connected to the arm 183 of the position follow up potentiometer 179. The arm 183 is driven by the servomotor 211 so as to vary the resistor element 177 of the potentiometer 179 in a sense dependent upon the electrical unbalance relation of the bridge circuit which in turn effects an alternating current error voltage applied through the coupling transformer 189 so as to cause the motor 211 to drive the arm 183 in a sense to balance the opposing voltages and effect a null output error voltage at the output coupling transformer 189. The shaft 225 further drives through a pinion 227, as shown diagrammatically by FIG. 3B, to angularly position the flight path angle cursor disc 53.

It will be seen then that upon the operator selectively positioning the panel switch 145 so as to close the switch contact 147, a voltage will be transmitted by the potentiometer 155 to the signal output transformer 189 where it is compared with an opposing voltage produced by the potentiometer 179. The arm 183 of the potentiometer 179 is adjustably positioned by the servomotor 211 to an angular position dependent upon the angular position of the flight path angle cursor disc 53 effected by the servomotor 211 through the gearing 221 and shaft 225. The potentiometer 179 produces then an output voltage proportional to the angle between the cursor and the horizontal center line 28 of the display instrument.

Thus if the cursor disc 53 does not display the same angle as that shown on the counter 169 which reflects the adjusted position of the potentiometer arm 153 of the potentiometer 155 effected by the manually operable knob 165, the arrangement is such that the coupling transformer 189 induces an error voltage into the secondary winding 193 of the coupling transformer 189 which is applied to the servo amplifier 201 so as to cause the servomotor 211 to effect a corresponding angular adjustment of the flight path angle cursor disc 53 until it is positioned to an angle such that its position when read on the flight path index 34 of the display instrument of FIG. 1 will be the same as that displayed by the counter 169 of the navigation control panel 100 of FIG. 3A.

Upon the foregoing conditions being established, voltage of the two potentiometers 155 and 179 will be the same and the servo control system of the motor 211 for angularly positioning the flight path angle disc 53 will be at a null. The cursor line 61 on the disc 53 will then show through the grid 32 etched on the grid glass disc 31 of FIGS. 1 and 2 to visually indicate to the operator the angle of the selected flight path of the aircraft to the aimpoint, represented by the center point 35 of the grid 32.

Now should the operator alternately set the panel selector switch 145 so as to open the switch contact 147 and close the switch contact 149, he would thereby bring into effect one of two fixed commands for the vertical navigation computer 110 of FIG. 3C and the display instrument of FIGS. 1 and 2.

Moreover upon no climb signal being applied through an output conductor 250, a selector relay 257 will be effectively deenergized. The output conductor 250 leads from an output terminal 252 of a computer logic circuitry provided in the navigation computer 110 to a control winding 254 of the relay 257 having a grounded terminal 255.

A fixed resistor network 261 will then upon the deenergization of the relay 257 produce a predetermined control voltage equivalent to a fixed descent angle preselected for the control of the aircraft under such conditions. The predetermined voltage provided by the resistor network 261 thereupon acts to control operation of the flight path angle servo including the coupling transformer 189, servo amplifier 201 and servomotor 211 which responds to the signal voltage supplied by the fixed resistor network 261 so that the cursor disc 53 will be angularly positioned by the servomotor 211 to a position corresponding to the pre-set angle represented by the resistor network 261.

The fixed resistor network 261 includes resistor elements 263 and 265 serially connected by a conductor 267 and having an end of the resistor 263 connected by a conductor 269 to an end of the resistor element 157 and to the conductor 162 leading through conductor 164 to the terminal 141 of the source of alternating current 135. An opposite end of the resistor 265 is connected to a grounded conductor 271.

In the aforenoted arrangement of the fixed resistor network 261 a conductor 273 leads from the switch contact 149 selectively closed by the switch arm 145 to a relay switch element 275 normally biased under spring tension into a position to close a relay contact 277 connected by a conductor 279 to the conductor 267 serially connecting the resistor elements 263 and 265. Also leading from the conductor 273 and the switch contact 149 closed by the selector switch 145 is an output conductor 281 to apply under such operating conditions a fixed descent angle signal voltage to an input terminal 283 of the navigation computer 110, illustrated diagrammatically by FIG. 3C. The fixed descent angle signal voltage acts through the navigation computer 110 to compute control signals for suitable control means of the aircraft to cause the aircraft in flight to descend at said fixed angle.

However upon the altitude selected by the operator by adjustment of the control knob 115 being greater than the prevailing or present altitude of flight of the aircraft, the computer logic circuitry of the navigation computer 110 applies an output voltage at the terminal 252 which is in turn applied through the conductor 250 to energize the control winding 254 of the relay 257 which in turn applies a magnetic force to actuate the relay switch arm 275 to open the relay switch contact 277 and close a second relay contact 287 connected to the grounded conductor 255 which in turn shorts the fixed resistor network 261 out of operation.

It will be seen then that upon a climb signal being applied by the navigation computer 110 to the relay 257 as upon the selected altitude being greater than the prevailing altitude of flight of the aircraft, the relay 257 will thereupon cause the circuit to the output signal transformer 189 to be grounded so that unless the servomotor follow up potentiometer 179 be centered at which the potentiometer arm 183 will be connected directly to the grounded conductor 181, there would be effected an output voltage signal at the coupling transformer 189 which would cause the servomotor 211 to adjust the potentiometer arm 183 in a sense to the center or null signal position. The flight path angle servomotor 211 would thereupon cause the disc 53 to be so angularly adjusted that the cursor line 61 on the disc 53 would be aligned with the horizontal center line 28 on the grid of the transparent disc 31 of FIG. 1 and which would then represent to the operator a zero flight path angle. Such zero angle indication would thereupon provide a visual command signal to the operator for an immediate maximum climb performance (based on time or fuel) of the aircraft to the selected altitude by appropriate pilot operation.

OFFSET NAVIGATION AID POSITION (WAYPOINT INDICATOR DOT 77)

Under many operating conditions of the aircraft the aimpoint and waypoint, as indicated graphically by FIGS. 4 and 5, may in effect be at the same point. However, under other operating conditions, as indicated graphically in FIG. 6, the vehicle or aircraft operator may desire to achieve the preselected altitude at some distance (offset) before he reaches the selected waypoint and under the latter operating conditions he must in effect establish a new point in space as the aimpoint. The new aimpoint, under such circumstances, as indicated graphically in FIG. 6, being at the same altitude originally selected, as indicated at 45 of FIGS. 1 and at 118 and 45 of FIG. 3A, and would be located along the previously selected horizontal approach "track" at a distance from the originally selected waypoint equal to the offset distance. Since this new aimpoint, as indicated graphically in FIG. 6, would be the primary target of the vehicle's vertical maneuver, the center point 35 of the grid 32 of FIG. 1 will still represent the aimpoint, while a blue dot indicated by way of example in FIG. 1 by the numeral 77 will represent on the display instrument the waypoint shown graphically in FIG. 6.

Inasmuch as the actual vertical plane angle between the aimpoint and the waypoint shown graphically by FIG. 6 is zero under the supposed operating conditions, it will be seen that the red disc 55 shown in FIG. 3B will be fastened in a fixed position with the radial slot provided therein aligned with the horizontal grid center line 28 extending from the right side of the center point 35. Moreover since in the implementation of the invention described herein the vertical display of the instrument of FIG. 1 is intended only to show the offset distance when the aimpoint and waypoint are at the same altitude no servo mechanism has been provided for angularly positioning the red disc 55 with the radical slot provided therein.

It should be noted however that if capability for computing an offset in altitude as well as in distance is desired and included in the navigation computer 110, the actual angle to the offset point or waypoint would be computed and used to control suitable servomotor means to angularly position the red disc 55 and the angular position of the radial slot therein accordingly.

In the present embodiment of the invention, the offset distance is selected by the vehicle operator making an appropriate adjustment of an offset distance selector knob 300 provided on the navigation control panel 100. The offset distance selector knob 300 is mechanically connected by suitable operating means 303 to an offset distance miles counter 305 of conventional type provided on the control panel 100. The counter 305 is adjusted then by an operator adjustment of the knob 300 so as to read the desired distance in miles of the waypoint from the aimpoint or "offset distance" as shown graphically by FIG. 6.

Such adjustment of the knob 300 simultaneously effects a corresponding adjustment through the operating means 303 of an arm 307 variably contacting a resistor element 308 of a potentiometer 309 arranged to produce across a grounded input-output conductor 311 and an output conductor 313 leading from the arm 307 an electrical output signal which is proportional to the offset distance selected by the operator-operative adjustment of the knob 300. The variable resistor element 308 of the potentiometer 309 is connected to the grounded input conductor 311 and by an input conductor 315 to the conductor 163 and thereby across an output terminal 137 and grounded terminal 139 of the source of alternating current 135.

The operator-operative selected adjustment of the knob 300 and thereby the potentiometer arm 307 of the potentiometer 309 effects an alternating current output voltage across the output lines 311 and 313 which represents the selected "offset distance". This alternating current output signal voltage applied then across the output conductors 311 and 313 of the potentiometer 309 is transmitted to input terminals 145 and 320 of the navigation computer 110, shown diagrammatically by FIG. 3C, and which output signal voltage is utilized in the navigation computer 110 to provide control signals for operating suitable means to control the flight of the aircraft.

This "offset distance" signal voltage is also applied through a conductor 323 leading from the potentiometer arm 307 to one terminal of a primary winding 325 of a coupling output signal transformer 327. The opposite terminal of the primary winding 325 is connected by a conductor 329 to an adjustable arm 331 variably contacting a resistor element 333 of a follow up position potentiometer 335. One terminal of the resistor element 333 of the potentiometer 335 is connected to a grounded conductor 337 while an opposite terminal of the resistor element 333 is connected through a conductor 339 to a switch arm 341 of a slant distance excitation control relay 345.

The relay switch arm 341 of the relay 345 is normally biased under spring tension into a contacting relation with a relay contact 347 connected by an electrical conductor 349 to a relay switch arm 351 of a second slant distance excitation control relay 355. The relay switch arm 351 is normally biased under spring tension into contacting relation with a relay contact 357 connected by an electrical conductor 359 to a terminal 361 of the source of alternating current 135.

The source of alternating current 135 has in addition to the output terminal 361 other output terminals 363 and 365. The source of alternating current 135 is arranged to apply across the grounded terminal 139 and the terminal 361 an alternating current voltage of a relatively low amplitude while across the grounded terminal 139 and the terminal 363 there is applied an alternating current voltage of a relatively medium amplitude and across the grounded output terminal 139 and the output terminal 365 there is applied an alternating current voltage of a relatively high amplitude.

These alternating current voltages of relatively low, medium and high amplitudes are of a same phase and frequency as that of the alternating current voltage applied across the grounded terminal 139 and the output terminal 137 of the source of alternating current 135.

Moreover these alternating current voltages of high, medium and low amplitudes are controlled by the respective slant distance excitation control relay 345 and 355 and are so arranged as to change the instrument scaling automatically as the vehicle comes within the range of the larger (more sensitive) scales as hereinafter described in greater detail.

It is sufficient to say for purpose of the present explanation that the slant distance alternating current excitation applied then through the conductor 339 and grounded conductor 337 across the resistor element 333 of the position follow up potentiometer 335 is applied through the output conductor 329 to the primary winding 325 of the signal coupling transformer 327 so as to act in opposition to the voltage applied by the offset distance potentiometer 309.

A resultant difference between the compared alternating current signals applied to the primary winding 325 will then induce an error signal in a secondary winding 375 of the coupling transformer 327. Secondary winding 375 has one terminal connected to a grounded conductor 377 and an opposite terminal connected through a conductor 379 to an input terminal 381 of a servo amplifier 383 having a grounded input-output conductor 385. The servo amplifier 383 has an output terminal 387 from which leads an output conductor 389 to one terminal of a control winding 391 of a two phase servomotor 395 having a fixed phase winding 397. One terminal of the fixed phase winding 397 is connected through the conductor 399 to the conductor 161 and thereby through conductor 163 to the terminal 137 of the source of alternating current 135 while an opposite terminal of the fixed phase winding 397 and a terminal of the control winding 391 are connected to a grounded conductor 400.

Servomotor 395 drives through an output shaft 401, gear train 403 and shaft 405 a suitable drive means 407 connected to the potentiometer arm 331 of the position follow up potentiometer 335 and a pinion 409, as shown in FIG. 3B, to angularly position the red disc 57 having provided therein a spiral slot, as heretofore described.

A portion of the spiral slot in disc 57, which corresponds to the offset distance voltage selected by the operator adjustment of the knob 300, coincides with the radial slot provided in the fixed red disc 55 so as to permit a beam of light passing through the blue discs 60 and 58 to in turn pass through a small clear opening formed by the intersections of the slots of the discs 57 and 55 and which beam of light will then appear to the observer at the front of the display instrument to be a blue dot 77 of light on the grid 32 having a geometric shape defined by the edges of the radial slot in the red disc 55 and the spiral slot in the red disc 57. The remaining blue light passing through the red colored disc 55 and 57 will be filtered until it is dim in comparison to the blue dot 77 of light indicative of the waypoint.

Upon the red disc 57, provided with the spiral slot, being in an angular position other than that called for by the offset distance voltage of the potentiometer 309, the opposing voltage provided by the position follow-up potentiometer 335 will not balance that of the offset distance voltage and an electrical distance error voltage will be induced in the secondary winding 375 of the coupling transformer 327. The induced error voltage will in turn be amplified by the servo amplifier 383 to cause the servomotor 395 to be driven in a sense to angularly reposition the disc 57 through the gear train 403, together with the potentiometer arm 331 of the position follow-up potentiometer 335 until the angular position of the red disc 57 corresponds to the offset distance. Thereupon the angular position of the potentiometer arm 331 in relation to the variable resistor 333 of the position follow-up potentiometer 335 will be such that the opposing output voltage provided by the potentiometer 335 will balance the distance voltage provided by the offset distance setting potentiometer 309. Such opposing voltages applied in the primary winding 325 of the coupling transformer 327 will then be in a balanced relation so as to induce a null error signal voltage in the secondary winding 375 of the transformer 327. Whereupon the operation of the servomotor 395 will terminate and the red disc 57 will be in such an angular position that the spiral slot provided therein will be in a proper position relative to the radial slot in the disc 55 as to effectively project a blue dot 77 of light upon the grid 32 in a position indicative of the waypoint, as shown graphically by FIG. 6.

VEHICLE POSITION (RED DOT 75)

In projecting the vehicle position indicator red dot 75 onto the grid 32 as shown in FIG. 1, the blue disc 58 in which is provided a radial slot is angularly adjusted to a position corresponding to the actual vertical plane angle of the aircraft in flight to the aimpoint, indicated in FIG. 1 by the center point 35 of the grid 32. Based on the geometric comparison previously described and shown graphically in FIGS. 4, 5 and 6, the navigation computer 110 of FIG. 3C is so arranged as to apply across output terminal 420 and the grounded output terminal 145 an alternating current signal voltage of a frequency corresponding to that of the frequency of the source of alternating current 135 and of a phase corresponding to that of the phase of the alternating current applied across the output terminals 137 and 139 or terminals 139 and 141 of the source 135 dependent upon whether the actual angle to the aimpoint of the aircraft in flight is ascending, as shown graphically in FIG. 5, or descending as shown graphically in FIGS. 4 and 6.

This signal voltage which is of a magnitude proportional to the actual vertical plane angle of the aircraft in flight to the aimpoint. Furthermore the actual angle to aimpoint signal voltage applied across the terminals 145 and 420 is compared to an opposing slider voltage provided by a position follow-up potentiometer 425.

Thus the terminal 420 is connected by an electrical conductor 427 to one terminal of a primary winding 429 of an output coupling transformer 431 and which primary winding 429 has an opposite terminal connected by a conductor 433 to the variably positioned arm 435 operatively positioned in relation to a variable resistor 437 of the position follow-up potentiometer 425. The resistor element 437 has a grounded center tap 439 and one terminal of the resistor 437 is connected by an electrical conductor 441 to switch contacts 443 and 445 controlled by relay switch arms 447 and 449 respectively of a reversing relay 450.

The relay switch 447 is normally biased under spring tension so as to open the switch contact 443 and close a switch contact 452 connected by a conductor 454 to an opposite end of the resistor element 437 from that of the conductor 441. Further the relay switch arm 449 is normally biased under spring tension into a contacting relation with the contact 445 and into a position opening a switch contact 456. The switch contact 456 is connected by an electrical conductor 458 to the conductor 454 leading to the opposite end of the resistor 437 from the conductor 441.

The reversing relay 450 includes an electromagnetic control winding 460 effective upon energization to bias the relay switch arm 447 out of a switch closing relation with the contact 452 and into a position to close the switch contact 443, while the relay switch arm 449 will be simultaneously biased out of switch closing relation with the contact 445 and into a position to close the relay switch contact 456.

In this connection, it may be noted that the relay switch arm 447 is connected by an electrical conductor 462 which leads, as shown by FIG. 3A, through the conductors 162 and 164 to the terminal 141 of the source of alternating current 135. The relay switch arm 449 is connected by an electrical conductor 465, which leads as shown by FIG. 3A, through the conductors 217, 161 and 163 to the terminal 137 of the source of alternating current 135. The alternating current thus applied through the conductor 462 to the relay switch arm 447 will be of a phase which leads by 180° the phase of the alternating current applied through the conductor 465 to the relay switch arm 449. It will be seen then that so long as the reversing relay 450 is deenergized the alternating current applied through the relay switch arm 447 and conductor 454 to one end of the resistor element 437 will lead by 180° the phase of the alternating current applied through the relay switch arm 449 and conductor 441 to the opposite end of the resistor element 437. However upon the electromagnetic relay 450 being energized, as hereinafter explained, the relay switch arms 447 and 449 will be actuated so as to open the respective switch contacts 447 and 445 and close the switch contacts 443 and 456 respectively so as to reverse the alternating currents heretofore applied at the respective opposite ends of the resistor element 437 of the potentiometer 425 for a purpose which will be explained in greater detail hereinafter.

The actual angle to aimpoint signal voltage applied by the computer 110 to the conductor 427 is compared in the primary winding 429 of the signal coupling transformer 431 to a slider signal voltage applied by the potentiometer 425 to the potentiometer arm 435 and thereby to the conductor 433 connected to the primary winding 429 so as to effect a difference voltage in the primary winding 429 which induces an error signal voltage in the secondary winding 475 of the output coupling transformer 431.

One terminal of the secondary winding 475 is connected to a grounded conductor 477 while the opposite terminal of the secondary winding 475 is connected by an electrical conductor 479 to an input terminal 481 of a servo amplifier 483 having a grounded input-output terminal 485. An opposite output terminal 487 of the servo amplifier 483 is connected by an output conductor 489 to one terminal of a control winding 491 of a two phase servomotor 493. The opposite terminal of the control winding 491 is connected to a grounded conductor 495. The servomotor 493 also includes a fixed phase winding 497 connected at one terminal to the grounded conductor 495 and at an opposite terminal through a conductor 499 to the conductor 465 leading in turn through conductors 217, 161 and 163 to the terminal 137 of the source of alternating current 135.

Servomotor 493 drives through an output shaft 501, gear train 503, shaft 505, and shaft 507 a pinion 509 for angularly positioning the blue disc 58 having provided therein a radial slot, as heretofore explained. The shaft 507, as thus driven by the servomotor 493, is also drivingly connected through a gear train 511, shaft 513 and shaft 515 so as to angularly position the slider arm 435 of the potentiometer 425 in response to the error signal applied through the output coupling transformer 431 to position the potentiometer arm 435 in a sense to null the error signal.

In the aforenoted operation, it should be noted that the potentiometer 425 produces a voltage proportional to the angle between the radial slot provided in the blue disc 58 and the horizontal center line 28 of the grid 32, as shown by FIG. 1.

During such operation in the event the voltage from the potentiometer 425 does not agree with the actual angle signal voltage provided at the conductor 427 by the computer 110, then the output signal transformer 431 transmits a difference or error voltage to the servo amplifier 483 which in turn signals the servomotor 493 to drive through the gear train 503 so as to reposition the blue disc 58, having the radial slot therein, in an angular sense to bring the radial slot into correspondence with the actual vertical plane angle of the aircraft in flight to the aimpoint as signalled by the computer 110 and at which adjusted angular position of the blue disc 58 the slider arm 435 of the potentiometer 425 will be so positioned by the servomotor 493 through the gear train 511 and shafts 513 and 515 as to provide an output signal voltage from the potentiometer 425 which balances that of the signal voltage applied by the computer 110 at the conductor 427. This will in turn null the controlling error signal voltage whereupon the servomotor 493 will have angularly positioned radial slot provided in the blue disc 58 to a position corresponding to that called for by the actual angle to aimpoint signal voltage provided by the computer 110.

It should be further borne in mind, however, that the vehicle or aircraft in actual flight may be preceeding either (1) towards or (2) away from the space position (aimpoint) indicated in the display of FIG. 1 by the center point 35. In the first situation (1) the position of the aircraft will be indicated at the left of the vertical line 26, as shown by FIG. 1 by the red dot 75; or in the second situation (2) upon the vehicle or aircraft travelling away from the space position (aimpoint), the position of the aircraft on the grid 32 would be indicated by a red dot 75 at the right of the vertical line 26.

In the present invention, there is provided means to assure a correct display of the aircraft red dot 75 on either side of the grid vertical center line 26 dependent upon the flight position thereof in relation to the aimpoint or center point 35. This is effected through the operation of the reversing relay 450, shown diagrammatically in FIG. 3C, as explained hereinafter.

The reversing relay 450 in providing means to assure this desired display operation includes a relay control winding 460 which upon energization and deenergization causes actuation of the relay switch arms 447 and 449 to reverse the connections of the leading and lagging phase terminals 141 and 137 respectively of the source of alternating current 135 across the position follow up resistor 425, as heretofore explained, and in addition energization and deenergization of the relay winding 460 also causes actuation of a relay switch arm 518 to selectively open and close relay switch contacts 520 and 522. The relay switch arm 518 is normally biased under spring tension to close the switch contact 520 while relay switch arm 518 upon energization of the relay winding 460 is actuated to a position opening the switch contact 520 and closing the relay switch contact 522. The switch arm 518 is connected by an electrical conductor 524 to the conductor 479 while the relay switch contact 520 is connected by an electrical conductor 526 to an angularly positioned switch arm 528 of an ambiguity switch 530 and the relay switch contact 522 is connected by an electrical conductor 532 to an angularly positioned switch arm 534 of an ambiguity switch 536. The switch arm 528 of the ambiguity switch 530 and the switch arm 534 of the ambiguity switch 536 are driven from a common shaft 540 operably connected to the shaft 507 driven through a gearing 503 and shaft 501 by the servomotor 493. The switch arm 528 is arranged to selectively make electrical contact with an arcuate contact element 542 having an open contact range 545 effective during normal operation in which the angularly positioned switch arm 528 is out of electrical contacting relation with the arcuate switch contact element 542.

Similarly in the ambiguity switch 536 the angularly positioned switch arm 534 is arranged to selectively make electrical contact with an arcuate switch contact element 552 having an open contact range 556 effective during normal operation in which the switch arm 534 is out of contacting relation with the arcuate switch contact element 552.

The normal operating range of the ambiguity switch 530 extends over an open contact range 545 of approximately 180° and from about 180° to 360° while the normal operating open contact range of the ambiguity switch 536 extends over a like 180° range 556 of from about 0° to 180° arranged in a diametrically opposite relation to that of the open contact range 545, as best shown diagrammatically in FIG. 3B. Both of the arcuate contact elements 542 and 552 are connected by an electrical conductor 550 connected at 555 to the electrical conductor 465 leading, as heretofore explained, from the terminal 137 of the source of alternating current 135.

The angularly positioned switch arms 528 and 534 are arranged in a like angular relation on the common drive shaft 540 so that upon one of the switch arms 528 or 534 being positioned in the normal open contact operating range of 545 or 556, respectively, the other of the said switch arms will be in a contacting relation with the arcuate switch element 542 or 552 as the case may be. It will be seen then that whether the one or the other of the switch arms in electrical contact with the arcuate switch element 542 or 552 will be operatively effective will be dependent upon whether the one or the other ambiguity switch 530 or 536 is rendered effective by the relay switch 518 closing the switch contact 520 or 522 of the reversing switch 450 controlling the effective operation thereof.

In the example shown in FIG. 3B with the reversing relay 450 being deenergized, it will be seen that the relay switch arm 518 will close contact 520 and inasmuch as the switch arm 528 of the ambiguity switch 530 is shown positioned in the open contact range 545 or normal operating range shown diagrammatically in the example 3B, there will be no action effected by the ambiguity switch 530.

However upon the reversing relay 450 being energized, the relay winding 460 would thereupon cause the relay switch arm 518 to be biased out of contacting relation with the switch contact 520 and into a closing contact relation with the switch contact 522. It will be seen then that in the example illustrated by FIG. 3B, the ambiguity switch 536 would then be brought into operation, in that the switch arm 534 in making electrical contact with the arcuate switch contact element 552 would thereupon electrically connect the alternating current applied across the terminals 137 and 139 of the alternating current source 135 directly across the input lines 479 and 485 to the servo amplifier 483. Such connection would cause the servomotor 493 to be driven in a sense to angularly position the contact arm 534 out of the contacting relation with the switch element 552 and into the open contact normal operating range 556. Such operation would also cause the shaft 507 driven by the servomotor 493 to also effect an angular adjustment of the blue disc 58 so that the radial slot therein would be adjusted angularly from a position to the left of the center point 35 of the display of FIG. 1 to a position to the right of the center point 35. Thereafter the normal control operation of the servomotor control system in response to the actual angle to aimpoint signal voltage applied by the computer 110 would become effective.

Similarly upon the reversing relay 450 becoming deenergized, the relay switch arm 518 under spring tension would thereupon open the switch contact 522 and close the relay switch contact 520. Such action, as upon initiation of operation of the display, would bring into effect the ambiguity switch 530 which would then have the angularly positioned switch arm 528 in a contacting closing relation with the arcuate switch contact element 542 and thereupon once again connect across the input lines 479 and 485 of the amplifier 483 the alternating current output applied across the terminals 137 and 139 of the source of alternating current 135. This would again cause the servomotor 493 to drive through the shafts 507 and 540 the switch arm 528 out of contacting relation with the arcuate switch contact element 542. Simultaneously the switch contact element 534 would again move into contacting relation with the arcuate switch element 552 of the ambiguity switch 536. This action would in turn also cause the blue disc 58 to be driven by the shaft 507 in a sense to position the radial slot therein once again to the left of the center point 35 of the display of FIG. 1. Thereafter normal control operation of the servo system by the servomotor 493 would be brought into operation so that the red dot 75 indicative of the position of the aircraft would once again be shown to the left of the vertical line 26 in accordance with the actual angle to aimpoint signal voltage applied by the navigation computer 110 to the output line 427, as heretofore explained.

It will be seen from the foregoing that since the vehicle or aircraft in actual flight may be proceeding towards the space position (aimpoint) indicated in the display of FIG. 1 by the numeral 35 in which case the aircraft position should be shown at the left of the vertical line 26 by the red dot 75, as shown in the example of FIG. 1. Moreover the aircraft may be travelling away from the space position or center point 35 in which case the red dot aircraft indicated position 75 should be shown at the right of the vertical line 26 of FIG. 1.

It is necessary then to provide the ambiguity switch means 530 and 536 and to control of the reversing relay 450 so as to effect the display of the aircraft red dot 75 from one side or the other of the grid vertical center line 26. Moreover in order to control the energization of the reversing relay 450, there may be provided in the navigation computer 110 a device to produce the horizontal location of the space position of the aircraft as for example by a conventional "Vortac" device, course-line computer, or inertial platform to effect in the navigation computer 110 and across output terminal 575 and grounded output terminal 145 a "from" signal voltage applied through a line 577 to the relay winding 460 and in turn through a grounded conductor 579 serves to effect energization of the relay 450, as upon the aircraft travelling away from the space position or aimpoint indicated by the center point 35 of the display of FIG. 1.

Thus upon the "from" signal being applied at the output terminal 575 of the computer 110 the relay 450 is rendered effective to connect the ambiguity switch 536 into operative relation with the servo amplifier 483 and thereby cause servomotor 493 to angularly position the blue disc 58 and the radial slot provided therein to a position at the right side of the center point 35 of the instrument phase of display device as shown in FIG. 1.

Moreover the ratio of the gear train 511 is so computed that the switch arm 435 of the potentiometer 425 driven by the servomotor 493 through the gear train 511 will thereupon be so positioned as to produce an output voltage from the potentiometer 425 proportional to the angle between the blue disc radial slot and the right horizontal center line 28 of the grid 32.

Furthermore, since it is recognized that the actual angle signal voltage applied at the output terminal 420 of the navigation computer 110 does not change its positive or negative sense, the relay 450 is so arranged that upon energization the control winding 460 of the relay 450 actuates the other relay switch arms 447 and 449 so as to close the relay switch contacts 443 and 456, respectively, so as to in effect reverse the excitation to the potentiometer 425 from the source of alternating current 135 so that the controlling error signal voltage induced in the secondary winding 475 and applied through the servo amplifier 483 to the control winding 491 of the servomotor 493 will be of a proper phase sense to cause the servomotor 493 to drive the blue disc 58 in a proper sense and direction to effect the display of the aircraft indicator red dot 75 properly at the right of the vertical line 26.

However cessation of the "from" signal causes the operation of the relay 450 to disconnect the ambiguity switch 536 and connect into operation the alternate ambiguity switch 530 so as to effect through the servo amplifier 483 the positioning of the radial slot of the blue disc 58 by the servomotor 493 to the left side of the vertical line 26 of the instrument face of the display instrument, as shown in FIG. 1.

The control arm 435 of the potentiometer 425 will be thereupon driven through the gear train 511 by the servomotor 493 in such a manner that the potentiometer in the normal operating range 545 of the ambiguity switch 542 produces a voltage proportional to the angle between the radial slot of the blue disc 58 and the left horizontal center line 28 of the grid 32 of the display device of FIG. 1.

In the foregoing operation of the blue disc 58, it should be borne in mind that the spiral slot of the blue disc 60 is so angularly positioned in relation to the angular position of the radial slot of the blue disc 58 that the position of the aircraft indicator red light dot 75 projected onto the grid 32 corresponds to the vertical plane slant distance to the aimpoint or center point 35.

In effecting such operation, the navigation computer 110 provides at an output terminal 600 by conventional means, a voltage proportional to the altitude difference between the aircraft in flight and the preselected altitude, as indicated graphically at FIGS. 4, 5 and 6. The computer 110 output altitude difference signal voltage is applied through a conductor 602 to an input terminal 604 of an amplifier 606 having a grounded input-output terminal 608.

The amplifier 606 includes a sine function potentiometer 610 having a variable resistor element 612 and an adjustable resistor arm 614 adjustably positioned in relation to the resistor element 612 by a shaft 616 drivingly connected to the output shaft 513 of the gear train 511 driven by the servomotor 493 in response to the actual angle to aimpoint signal voltage applied at the terminal 420 of the navigation computer 110.

The resistor element 612 and variable resistance adjustment arm 614 are connected by electrical conductors 618 and 620 respectively in conventional manner into the amplifier circuitry of the amplifier 606 so as to adjust the gain of the amplifier 606 dependent upon the actual angle to aimpoint signal voltage and in such a manner that the output voltage of the amplifier 606 applied at the output terminal 625 is a product of the altitude difference voltage applied at the output terminal 600 of the computer 110 and the reciprocal of the actual angle sine function, and which product provides an output signal voltage indicative of the slant distance from the vehicle in flight to the selected aimpoint, as shown graphically by FIGS. 4, 5 and 6.

This slant distance voltage applied across the output terminals 625 and 608 of the amplifier 606 is in turn applied through a conductor 627 to a terminal of a primary winding 629 of an output signal transformer 631. An opposite terminal of the primary winding 629 is connected by a conductor 633 to an adjustable arm 635 of a variable position follow-up potentiometer 637 having a resistor element 639 variably contacted by the resistor arm 635. One terminal of the resistor element 639 is connected to a grounded input-output conductor 641 while the opposite terminal of the resistor element 639 is connected through a conductor 643 to an electrical conductor 339 which as shown by FIG. 3A leads to the variable range slant distance excitation voltage provided at the source of alternating current 135, as hereinafter explained in greater detail.

This slant distance excitation voltage applied across the resistor 639 of the potentiometer 637 provides an output voltage from the potentiometer 637 which is applied to the primary winding 629 in opposition to the slant distance to a aimpoint signal voltage applied thereto through the conductor 627.

The slant distance to aimpoint signal voltage applied to the conductor 627 is thus compared in the primary winding 629 to the output of the potentiometer 637 and the resultant difference voltage induces in a secondary winding 650 an error signal voltage. The secondary winding 650 has one terminal connected to a grounded conductor 652 while the opposite terminal of the secondary winding 650 is connected by a conductor 654 to an input terminal 656 of a servo amplifier 658 having a grounded input-output terminal 660 and an opposite output terminal 662 from which leads an output conductor 664 to a terminal of a control winding 666 of a two phase servomotor 668. The opposite terminal of the control winding 666 is connected to a grounded conductor 670. The servomotor 668 has a fixed phase winding 672 having one terminal connected to the grounded conductor 670 and an opposite terminal connected by a conductor 675 to the conductor 465 leading in turn, as shown in FIG. 3A, to the output terminal 137 of the source of alternating current 135.

Servomotor 668 drives through an output shaft 680, a gear train 682, and shafts 685 and 687 to adjustably position the arm 635 of the potentiometer 637. Also the output shaft 687, as shown by FIG. 3B, is connected to an input element of a mechanical differential mechanism 690 having a second input element driven by a shaft 692 leading from the shaft 507 driven by the servomotor 493. The mechanical differential mechanism 690 has an output shaft 694 which in turn is operably connected to a pinion 696 for angularly positioning the blue disc 60 having the spiral slot, as heretofore specified.

It will be seen from the foregoing arrangement that the slant distance to aimpoint signal voltage applied at the conductor 627 is compared to the output of the potentiometer 637 having the variable control arm 635 driven by the servomotor 668 through a suitable gearing together with the blue disc 60 to angularly position the spiral slot therein. Upon the position of the slant distance potentiometer control arm 635 being out of agreement with the slant range voltage applied at the conductor 627 an error signal voltage will be induced by the primary winding 629 of the coupling transformer 631 into the secondary winding 650 and which induced error signal voltage is in turn applied to the input of the servo amplifier 658 so as to cause the control winding 666 of the servomotor 668 to cause the servomotor 668 to reposition the control arm 635 of the potentiometer 637 together with the blue disc 60 in a sense to null the error signal voltage induced in the secondary winding 650.

In the aforenoted arrangement, the gear train 682 driven by the servomotor 668 has the output shaft 685 thereof connected to the shaft 687 to adjustably position the arm 635 of the potentiometer 637 as well as effect through the mechanical differential mechanism 690 rotation of the pinion 696 to angularly position the blue disc 60.

It should be further noted that the mechanical differential mechanism 690 has the second input shaft 692 connected through the shaft 507 to the shaft 505 and thereby to the output of the actual angle to aimpoint controlled servo gear train 503. Thus when the actual angle to the aimpoint voltage applied by the computer 110 to the conductor 427 changes, causing in turn the servomotor 493 to effect a change in the angular position of the blue disc 58 and the radial slot provided therein, the mechanical differential mechanism 690 also causes the angular relationship of the blue disc 60 having a spiral slot therein to be varied in relation to the radial slot of the blue disc 60. Thereupon, the relationship of the spiral slot in the blue disc 60 to the radial slot of the blue disc 58 will be such as to permit passage of the beam of red light through the coinciding openings of the two slots to produce the red dot 75 on the grid 32 at a position indicative of the proper slant distance for the new angular position of the blue disc 58 bearing the radial slot.

Instrument Scaling

The distance, altitude and angular scales of the display instrument are selected to suit the speed, altitude and maneuvering capability of the vehicle or aircraft in which it is to be used. The scales would be quite different for a helicopter than for a supersonic transport for example, although the display method and means may be substantially the same for either. Furthermore, in the present invention means are provided to change the indicator scales automatically upon the aircraft or vehicle in flight coming within the range of the larger (more sensitive) scales.

Referring to the drawings of FIG. 3A, it will be seen that the alternating current power supply 135 through the operation of slant distance excitation control relays 345 and 355 selectively applies to the output conductor 339 a slant distance alternating current excitation voltage which may be in the different excitation ranges provided by the source of alternating current 135, including a relatively low range as provided at the terminal 361 or in a relatively medium range as provided at the terminal 363 or in a relatively high range as provided at the terminal 365 of the source of alternating current 135. The slant distance alternating current excitation voltage thus applied at the conductor 339 is applied across both the resistor 333 of the offset distance potentiometer 335 and the resistor 639 of the slant distance potentiometer 637 so as to thereby set the presentation scale factor of the display instrument, as hereinafter explained in greater detail.

The slant distance excitation control relay 345 has an electromagnetic control winding 704 while the slant distance excitation control relay 355 has an electromagnetic control winding 706. The control winding 704 of the relay 345 upon energization is effective to magnetically bias the relay switch element 341 out of a contacting relation with the relay contact 347 and into a contacting relation with a relay contact 710. The relay contact 710 is connected by an electrical conductor 712 to the terminal 365 of the source of alternating current 135 and is thereupon effective upon the relay switch arm 341 closing the contact 710 to connect the output conductor 339 to the relatively high range of alternating current applied at the terminal 365.

The control winding 704 upon energization is also effective to bias simultaneously a relay switch arm 714 out of contacting relation with a relay contact 715 and into contacting relation with a relay contact 716 and a relay switch arm 718 into contacting relation with a relay switch contact 720. The relay switch arm 714 is normally biased under spring tension into contacting relation with the relay contact 715 and out of contacting relation with the contact 716 while the relay switch arm 718 is normally biased out of contacting relation with the contact 720.

The relay switch arm 714 is connected by an electrical conductor 722 to one terminal of the source of electrical energy or battery 725 having an opposite terminal connected by a conductor 726 to ground. The relay contact 716 is connected by an electrical conductor 728 to terminals of electrically illuminated annunciator lights 37 and 39 having opposite terminals connected to grounded conductors 730 and 732 as shown in FIG. 3A.

Thus upon the control winding 704 being energized to electromagnetically actuate the relay switch arm 714 into the contacting relation with the relay contact 716, the source of electrical energy 725 is connected across the annunciator lights 37 and 39 to effectively illuminate the same so as to indicate to the operator that the display instrument has been rendered effective for operation in a 200 mile and 100,000 foot scale range by the connection of the relatively high range alternating current terminal 365 of the source of alternating current 135 to the distance potentiometers 335 and 637.

The excitation of the control relay winding 704 of the slant distance excitation control relay 345 is also effective to actuate a relay switch arm 718 into contacting relation with a switch contact 720 to render effective a range change trigger switch 735 for controlling the operation of an "OR" gate 737 which in turn controls the energization of the winding 704 of the relay 345.

In effecting the latter operation, it will be noted that the relay switch contact 720 is connected by an electrical conductor 733 to a control terminal 734 of the "OR" gate 737. The relay switch arm 718 is normally biased under spring tension to an open contacting relation with the relay switch contact 720. However upon energization of the relay control winding 704 the switch arm 718 is actuated into contacting relation with the relay contact 720. The relay switch arm 718 has connected thereto a conductor 740 which, as shown in FIG. 3D, is connected to an arcuate segmental switch element 742 which may be contacted over a range of movement of approximately 270° by an arcuately movable switch arm 745, while over a second range of arcuate movement of approximately 90° indicated by the numeral 747, the switch arm 745 is effectively out of contacting relation with the arcuate segmental switch element 742.

The switch arm 745 of the range change trigger switch 735 is connected to an electrical conductor 750 which is in turn connected at 555 to the conductor 465 leading as heretofore explained through the conductors 217, 161 and 163 to the terminal 137 of the source of alternating current 135, as shown in FIG. 3A. The arm 745, as shown in FIG. 3B is mechanically driven through a shaft 752 operably connected to the output shaft 687 leading through the mechanical differential mechanism 690 and shaft 694 to the pinion 696 drivingly connected to the blue disc 60 provided with the spiral slot.

The arrangement of the range change trigger switch 735 is such that the switch arm 745 thereof will be in effective contacting relation with the arcuate switch element 742 so long as the blue disc 60 is angularly positioned over the normal operating range of the spiral slot therein as effected by the operation of the differential mechanism 690 by the shaft 687 which is also drivingly connected through the shaft 752 to the arm 745. However upon the angular adjustment of the blue disc 60 so that the spiral slot therein is positioned out of its normal operating range and into the range of the larger (more sensitive) scales, the arms 745 of the range change trigger switch 735 will be adjusted out of contacting relation with the arcuate switch element 745 and into the open contact range 747. Thereupon the alternating current applied through the conductor 740, relay switch arm 718, contact 720 and conductor 733 to the control terminal 734 of the "OR" gate 737 would be effectively removed by the switch arm 745 moving out of contacting relation with the arcuate segmental switch element 742 so as to permit the "OR" gate 737 to remove the voltage signal applied to the output terminal 753 connected through a conductor 755 to the control winding 704 of the relay 345.

However also controlling the electrical input applied across the output terminal 753 and the grounded input-output terminal 754 of the "OR" gate 737 are other control terminals 760 and 762 of the "OR" gate 737.

The control terminal 760 is connected through an electrical conductor 765 to a high signal voltage output terminal 767 of a voltage level detector 769 having a grounded input-output terminal 771 and an opposite input terminal 773 connected through an electrical conductor 775 to the conductor 323 at 777 so that the voltage level detector 769 senses the offset distance voltage applied at the output of the potentiometer 309.

Upon the selected offset distance voltage exceeding a predetermined high level the voltage level detector 769 is effective to apply across the output terminals 767 and 771 a high voltage signal which is applied through the conductor 765 to the control terminal 760 of the "OR" gate 737 so as to maintain across the output terminals 753 and 754 of the "OR" gate 737 an output signal voltage applied through the output conductor 755 to maintain the control winding 704 of the slant distance excitation control relay 345 in an energized condition.

Further the remaining control terminal 762 of the "OR" gate 737 is connected by an electrical conductor 780 to a high voltage signal output terminal 783 of a voltage level detector 785 having an input-output terminal connected to a grounded conductor 787 and an opposite input terminal 789 connected by a conductor 790 to the slant distance to waypoint signal voltage conductor 627 at a point 792 so that the voltage level detector 785 is effective to sense the slant distance to waypoint signal voltage applied across the output terminals 625 and 608 of the amplifier 606.

The arrangement of the voltage level detector 785 is such that when the slant distance to waypoint signal voltage at the line 627 exceeds a predetermined high level the detector 785 is effective to apply a "signal high" voltage to the control terminal 762 of the "OR" gate 737 so as to render the "OR" gate 737 effective to maintain an energizing current through the control winding 704 of the slant distance excitation control relay 345. The "OR" gate 737 is of a conventional type arranged to provide the energizing voltage through the output conductor 755 to the control winding 704 of the relay 345 upon any one or more of the control terminals 734, 760 and 762 having applied thereto a control signal voltage. The "OR" gate 737 is effective to terminate the energization of the control winding 704 of the relay 345 only upon a control signal voltage being applied to none of the control terminals 734, 760, and 762.

However upon the control winding 704 of the relay 345 becoming deenergized the respective relay switch arms 341, 714 and 718 return under spring tension to the position shown in FIG. 3A in which the switch arm 714 and 718 open the respective relay contacts 716 and 720 and the relay switch arm 341 opens the relay contact 710 and closes the relay contact 347 connected through the conductor 349 to the switch arm 351 of the companion control relay 355.

Upon deenergization of the control winding 706 of the slant distance excitation control relay 355, the relay switch arm 351 is biased under spring tension into contacting relation with a relay contact 357 connected through a conductor 359 to the relatively low range alternating current output terminal 361 of the source of alternating current 135. Thus upon deenergization of both the control relay winding 704 of the relay 345 and the control relay winding 706 of the relay 355 the relay switch arms 341 and 351 are thereupon rendered effective to connect the output conductor 339 to the relatively low range of alternating current applied at the terminal 361 of the source of alternating current 135.

The control winding 706 of the relay 355 upon energization is effective to magnetically bias the relay switch element 351 out of a contacting relation with the relay contact 357 into a contacting relation with a relay contact 800. The relay contact 800 is connected by an electrical conductor 802 to the relatively medium range alternating current output terminal 363 of the source of alternating current 135 and is thereupon effective upon the relay switch arm 341 of the companion control relay 345 closing the contact 347 to connect the output conductor 339 through the switch arm 341, relay contact 347, conductor 349, switch arm 351, relay contact 800 and conductor 802 to the relatively medium range of alternating current applied at the terminal 363 of the source of alternating current 135.

The control winding 706 upon energization is also effective to bias simultaneously a relay switch arm 805 into contacting relation with a relay contact 806 and a relay switch arm 808 into contacting relation with a relay switch contact 810. The relay switch arms 805 and 808 are normally biased under spring tension out of contacting relation with the respective relay contacts 806 and 810.

The relay switch arm 805 is connected by an electrical conductor 812 to the relay contact 715 of the companion control relay 345 so that upon deenergization of the control winding 704 of the relay 345 the switch arm 805 is connected through the electrical conductor 812, switch contact 715 and relay switch arm 714 to the source of electrical energy or battery 725.

Relay switch contact 806 is connected by an electrical conductor 814 to electric terminals of electrical illuminated annunciator lights 35 and 41 having opposite terminals connected to grounded conductors 818 and 820, as shown in FIG. 3A. Thus, upon the control winding 704 of the relay 345 being deenergized and the control winding 706 of the relay 355 being energized, the relay switch arm 714 will be biased under spring tension into a position closing the relay contact 715 and the relay switch arm 805 will be actuated by the energized electromagnetic control winding 706 into a position closing the switch contact 806. The source of electrical energy 725 will be then connected across the annunciator lights 35 and 41 so as to effectively illuminate the same and indicate to the operator that the display instrument has been rendered effective for operation in a 20 mile and 10,000 foot scale range by the connection of the relatively medium alternating current terminal 363 of the source of alternating current 135 to the distance potentiometers 335 and 637.

The energization of the control winding 706 of the shunt distance excitation control relay 355 is also effective to actuate a relay switch arm 808 into contacting relation with a switch contact 810 so as to render effective the range change trigger switch 735 for controlling the operation of an "OR" gate 837 having an output terminal 853 and a grounded input-output terminal 854. The "OR" gate 837 in turn controls the energization of the control winding 706 of the relay 355.

In effecting the latter operation, it will be noted that the relay switch contact 810 is connected by an electrical conductor 833 to a control terminal 834 of the "OR" gate 837. Relay switch arm 808 is normally biased under spring tension to an open contacting relation with the relay switch contact 810. However upon energization of the control winding 706 the switch arm 818 is actuated into contacting relation with the relay contact 810. The relay switch arm 808 has connected thereto an electrical conductor 840 which as shown in FIG. 3A is connected at 842 to the conductor 740 leading to the arcuate switch element 742 of the range change trigger switch 735.

The range change trigger switch 735 is arranged to apply through the relay switch arm 808 and closed relay switch contact 810 a signal voltage through the conductor 833 to the control terminal 834 of the "OR" gate 837 to render the "OR" gate 837 effective to apply across output terminals 853 and 854 an energizing voltage. The energizing voltage is applied through an output conductor 855 leading from the output terminal 853 of the "OR" gate 837 to a terminal of the control winding 706 of the relay 355 having an opposite terminal connected to a grounded conductor 857 to effect the energization of the control winding 706.

Thus so long as the blue disc 60 is angularly positioned within the normal operating range of the spiral slot therein, the switch element 745 makes electrical contact with the arcuate switch element 742 of the range change trigger switch 735, and a voltage will be applied to the "OR" gate 837 so as to assure the application of a signal voltage through the output conductor 855 for maintaining the relay winding 706 energized.

The "OR" gate 837 includes additional control terminals 860 and 862. A conductor 865 leads from the terminal 860 to a medium signal output voltage terminal 867 of the voltage level detector 769. The level detector 769 is effective upon the sensed offset distance voltage applied at the conductor 323 exceeding a predetermined medium level to apply through the conductor 865 a medium voltage signal applied to the control terminal 860 of the "OR" gate 837 so as to maintain a signal voltage on the output conductor 855 so as to effectively energize the control winding 706 of the relay 355.

Further the output control terminal 862 of the "OR" gate 837 is connected by an electrical conductor 870 to a medium voltage signal terminal 873 of the voltage level detector 785. The voltage level detector 785 is effective upon the sense slant distance to waypoint signal voltage applied at conductor 627 exceeding a predetermined medium voltage level to apply across the output terminals 873 and 787 of the voltage level detector 785 a medium voltage level signal voltage on the conductor 870 which is in turn applied to the control terminal 862 of the "OR" gate 837 to maintain an output voltage on the conductor 855 to cause the control winding 706 of the relay 355 to be effectively energized.

In the normal operation of the aforenoted arrangement when the slant distance to waypoint signal voltage applied at conductor 627 drops below a preset high level and the slant distance servomotor 668 moves to a position representing less than the predetermined lower limit of the high slant distance range, the operation will be such that the controlling signals applied to the "OR" gate 737 at control terminals 762 and 734 by the voltage level detector 785 and the range change trigger switch 735, respectively, will no longer be present, whereupon the output energizing voltage normally applied through the output conductor 755 of the "OR" gate 737 will terminate and the relay 345 will thereupon move to the deenergized position, causing a shifting of the control of the power supply 135 for the operation of the display instrument to the relay 355 and thereby to the medium alternating current output terminal 363, as hereinbefore explained. The display instrument is then conditioned for operation on the 20 mile and 10,000 foot range so long as the control winding 706 of the companion relay 355 is effectively energized, while the control winding 704 of the relay 345 is deenergized.

The "OR" gate 837 and relay 355 function in a like manner to switch the power supply 135 for operation on the relatively low alternating current range terminal 361 and the display instrument for a 2 mile and 1,000 foot range, upon the slant distance signal voltage applied at conductor 627 decreasing below the lower limit of a medium voltage as sensed by the voltage level detector 785.

Both the relays 345 and 355 effectively open the circuit from the range change trigger switch 735 when they are deenergized so as to prevent any reactivation of the relay 345 and 355 before restoration of the signal from the voltage level detector 785.

The offset distance voltage level detector 769 operates in the same manner as the voltage level detector 785, but instead is dependent upon the selected offset distance voltage to supply a high signal to the "OR" gate 737 of medium signal to the "OR" gate 837 to block action of either relay 345 or 355 upon the offset distance selected by the operator being greater than the range to be engaged.

Thus while the range change trigger switch 735 and the slant distance to waypoint signal voltage level detector 785 provide means effective under normal operating conditions to change the display instrument scales automatically upon the vehicle or aircraft in flight coming within the range of the larger (more sensitive) instrument scales; the offset distance voltage level detector 769 cooperates in the control system to block this automatic change in the event the operator selected offset distance would otherwise in effect cause an angular adjustment by the servomotor 395 of FIG. 3A of the spiral slot of the offset distance red disc 57 of FIG. 3B in such a manner as to project the blue dot 77 of FIG. 1 off of the grid 32 under such larger scale operating conditions.

Further in the aforenoted operation, the relay 345 and 355 also serve to close circuits to selectively illuminate the annunciator lights 37 and 39 or 35 and 41 so as to show the active range of operation of the display instrument.

Further the range change trigger switch 735 and the ambiguity switches 530 and 536 serve to place the instrument servos (and display discs) in the proper areas of operation in the event they are adjusted out of these areas upon power being initially applied to the display instrument to effect operation thereof.

In addition, the ambiguity switch 530 will cause the blue disc 58 to angularly position the radial slot therein from the left side of the vertically extending center line 26 to the right side of the vertical line 26 of the display instrument, as viewed in FIG. 1 upon the aircraft passing over the aimpoint indicated by numeral 35 of the display instrument of FIG. 1 and proceeding past such point so as to cause a "from" signal to be applied by the computer 110 to the output conductor 577, as viewed in FIG. 3C.

ALTITUDE HOLD

However as shown diagrammatically in FIGS. 3A, 3B and 3C, as the vehicle or aircraft in flight approaches the preselected altitude shown graphically on FIGS. 4, 5 and 6, the navigation computer 110 is arranged to provide for an automatic-altitude capture and hold control of the aircraft in flight. When the computer 110 is operating in the hold mode, a logic voltage signal is provided which is applied across an output terminal 900 and the grounded input-output terminal 145 of the computer 110.

The output terminal 900 of the computer 110 is connected by a conductor 902 to a terminal of a electromagnetic control winding 904 having an opposite terminal connected to a grounded conductor 906. Upon the altitude capture voltage signal being applied across the output terminals 900 and 145 of the computer 110, control winding 904 is effectively energized so as to actuate an armature 908 into the coil 904 against the biasing force of a spring 910. An actuator arm 912 is pivoted at 914 and operably connected at 916 to the armature 908 so as to cause the flag 49 to be displayed in the opening 48 of the display instrument, as shown in FIG. 1. Upon the altitude capture voltage signal being terminated the flag 49 under the biasing force of the spring 910 will be biased out of the opening 48 into a return position, as shown diagrammatically by FIG. 3B.

When the computer 110 is operating in the hold mode, the available logic voltage signal is used to position the flag 49 in the mask window 48 of the display instrument 10 to indicate to the operator that the vehicle or aircraft is following a horizontal path in the vertical plane corresponding to the preselected altitude indicated graphically in FIGS. 4, 5 and 6.

Normally when the navigation computer 110 is operated through an altitude capture maneuver, it automatically transfers the control of the aircraft to an altitude hold mode of operation and the flag 49 will be maintained in the position in the window 48 exposed to the view of the operator.

When the navigation computer 110 senses that the aircraft has deviated from the hold altitude condition by a predetermined amount, the altitude capture signal voltage applied to the conductor 902 will terminate causing the electromagnetic winding 904 to be deenergized and the flag 49 to be biased by the spring 910 out of the window 48 so as to disappear from the view of the operator and thereby warn the pilot that the aircraft is no longer at the pre-selected altitude. The flag 49 thus serves as a visual alerting device to warn the pilot of the aircraft that the aircraft in flight is approaching or departing from a pre-selected altitude.

The altitude capture signal conductor 902 is also connected through a conductor 922 to a terminal of another electromagnetic control winding 924 of a relay having an opposite terminal of the control winding 924 grounded at 926.

The relay winding 924 is arranged to operatively control a relay switch arm 928 normally biased under spring tension to a contact open relation to a relay contact 930. Upon energization of the control winding 924 effected by an altitude capture signal voltage being applied through the conductor 902 from the computer 110, the control winding 924 effects an electromagnetic force which biases the switch arm 928 in opposition to the spring tension thereof into a contact closing relation with the relay contact 930.

The relay switch arm 928 is connected by an electrical conductor 932 to one terminal of a source of electrical energy or battery 934 while the opposite terminal of the battery 934 is grounded at 936. The relay contact 930 is connected by an electrical conductor 938 to one terminal of an electrically operated audio alarm 940 of a conventional type which may be arranged in a headset of the pilot and having an opposite terminal grounded at 942. Thus upon the relay switch arm 928 closing the relay contact 930 in response to the altitude capture signal voltage applied at conductor 902 effecting energization of the relay control winding 924, the source of electrical energy 934 will be connected to the audio alarm 940 and there will be generated an audio signal at the alarm or headset 940 of the pilot which will serve as an audible alert to warn the pilot that the aircraft in flight is approaching or departing from the pre-selected altitude shown graphically at FIGS. 4, 5 and 6.

While only one embodiment of the invention has been illustrated and described, various changes in the form and relative arrangements of the parts, which will now appear to those skilled in the art may be made without departing from the scope of the invention.

What is claimed is:

1. A display instrument comprising a display plate bearing grid lines and an indicia point, and means to project on the display plate a beam of light to show a symbolic relationship of the vehicle in flight to the indicia point and to the grid lines, the indicia point being indicative of the aimpoint of the vehicle and the grid lines being indicative of altitude and distance of the vehicle relative to the aimpoint, other means to project on to the display plate a cursor line, means to adjust said other means to angularly position the cursor line projected on to the display plate by said other means so as to define a desired path of the vehicle in a vertical plane of flight to the aimpoint indicated by the indicia point of the display plate, other indicia borne by the display plate and associated with the grid lines to indicate the distance and altitude of the vehicle shown in symbolic relationship by the beam of light to both the aimpoint indicated by the indicia point of the display plate and to the desired path of the vehicle in the vertical plane of flight defined by the cursor line, and angular indicia borne by the display plate and associated in cooperative relation with the cursor line to indicate the desired angle of flight of the vehicle shown by the beam of light in symbolic relationship thereto.

2. A display instrument comprising a display plate bearing grid lines and an indicia point, and means to project on the display plate a beam of light to show a symbolic relationship of the vehicle in flight to the indicia point and to the grid lines, the indicia point being indicative of the aimpoint of the vehicle and the grid lines being indicative of altitude and distance of the vehicle relative to the aimpoint, operator-operative means to preselect altitude of flight of the vehicle at the aimpoint indicated by the indicia point of said display plate, and means operated by the operator-operative means to indicate the preselected altitude of said indicated aimpoint.

3. The combination defined by claim 2 including other means to project onto the display plate a second beam of light to show a symbolic relationship of a waypoint of the vehicle in relation to the aimpoint and in relation to the position of the vehicle in flight shown symbolically by the first mentioned beam of light projected onto the display plate, and other operator-operative means to set the other means to project the second beam of light onto the display plate so as to show symbolically the waypoint at a predetermined offset distance from the aimpoint indicated by the indicia point.

4. A display instrument comprising a display plate bearing grid lines and an indicia point, and means to project on the display plate a beam of light to show a symbolic relationship of the vehicle in flight to the indicia point and to the grid lines, the indicia point being indicative of the aimpoint of the vehicle and the grid lines being indicative of altitude and distance of the vehicle relative to the aimpoint, means to operably position the light projecting means so that the beam of light symbolic of the relationship of the vehicle in flight may be effectively shifted from one side of the indicia point borne by the display plate to an opposite side of the indicia point upon the vehicle in flight passing the aimpoint of the vehicle indicated by the indicia point.

5. A display instrument comprising a display plate bearing grid lines and an indicia point, and means to project on the display plate a beam of light to show a symbolic relationship of the vehicle in flight to the indicia point and to the grid lines, the indicia point being indicative of the aimpoint of the vehicle and the grid lines being indicative of altitude and distance of the vehicle relative to the aimpoint, means to compute flight distance of the vehicle to the aimpoint indicated by the indicia point of said display plate, and means responsive upon the computed flight distance decreasing below a predetermined value to effect an amplification of the symbolic relationship of the beam of light to the grid lines indicative of the altitude and distance of the vehicle in relation to said indicated aimpoint.

6. The combination defined by claim 5 including means to operably position the light projecting means so that the beam of light symbolic of the relationship of the vehicle in flight may be effectively shifted from one side of the indicia point borne by the display plate to the opposite side of the indicia point upon the vehicle in flight passing the aimpoint of the vehicle indicated by the indicia point.

7. A display instrument comprising a display plate bearing an indicia point indicative of an aimpoint of a vehicle in flight, means to project on the display plate a beam of light to show a symbolic relationship of the vehicle in flight to the indicia point indicative of the aimpoint of the vehicle, means to project onto the display plate a cursor line extending from the indicia point borne by the display plate at one end of the cursor line, and means to position the cursor line projecting means so as to pivot the projected cursor line about the indicia point at said one end of the cursor line so as to define a desired path of the vehicle in a vertical plane of flight to the aimpoint indicated by the indicia point of the display plate.

8. The combination defined by claim 7 including operator-operative means to selectively position the means to project onto the display plate the cursor line so as to define a desired path of the vehicle in a vertical plane of flight to the aimpoint in a predetermined angular relation.

9. A display instrument comprising a display plate bearing an indicia point indicative of an aimpoint of a vehicle in flight, means to project on the display plate a beam of light to show a symbolic relationship of the vehicle in flight to the indicia point indicative of the aimpoint of the vehicle, means to project onto the display plate a cursor line so as to define a desired path of the vehicle in a vertical plane of flight to the aimpoint indicated by the indicia point of the display plate, other means to project onto the display plate a second beam of light to show a symbolic relationship of a waypoint of the vehicle in relation to the aimpoint and in relation to the position of the vehicle in flight shown symbolically by the first mentioned beam of light projected onto the display plate.

10. The combination defined by claim 9 including, operator-operative means to set the other means to project the second beam of light symbolic of the waypoint at a predetermined offset distance from the indicia point indicative of the aimpoint of the vehicle.

11. For use in an aircraft instrument of a type including a display plate, a control means for receiving signals indicative of a position of the aircraft in flight relative to an aimpoint, and light projecting means including a pair of discs, one of said discs including a radial slot, and the other of said discs including a spiral slot, said slotted discs being operable by said control means so as to position said slots in a cooperative relation to effectively project therethrough onto the display plate in response to said signals a beam of light indicative of the flight position of the aircraft in relation to the aimpoint; the improvement comprising an indicia point carried by the display plate in concentric relation to the slotted discs for indicating the aimpoint on the display plate, and an ambiguity switching means operably by said control means and effective to cause said control means in response to said signals to angularly position the one disc and thereby the radial slot therein from one side of the indicia point to an opposite side of the indicia point upon the aircraft in flight proceeding from a point before the aimpoint to a point past the aimpoint indicated by the indicia point carried by the display plate, whereupon the beam of light indicative of the position of the aircraft in flight may be projected onto said display plate at said opposite side of the indicia point.

12. The improvement defined by claim 11 including a third disc concentrically mounted in relation to said indicia point, such third disc including means arranged for projecting a cursor line effectively onto the display plate to indicate a predetermined flight path for the aircraft to the aimpoint indicated by the indicia point carried by the display plate, and operator-operative means to angularly position said third disc so as to angularly vary the position of the cursor line projected onto the display plate in relation to the aimpoint indicated by the indicia point carried by the display plate.

13. The improvement defined by claim 11 including scale means on the display plate for indicating altitude and bearing distance of the aircraft at the flight position indicated by the beam of light relative to the aimpoint over a first predetermined scale range, and means for shifting the operation of said slotted discs by said control means relative to the scale means from the first scale range to a second predetermined scale range.

14. The improvement defined by claim 11 including scale means on the display plate for indicating altitude and bearing distance of the aircraft at the flight position indicated by the beam of light relative to the aimpoint over a plurality of predetermined scale ranges, means for shifting the operation of said slotted discs by said control means relative to the scale means from one of said scale ranges to another of said ranges, and a range change trigger switching means operable by the adjusted angular position of the other of said pair of discs by said control means to render effective the means for shifting the range of indication by the scale means from the one to the other scale range.

15. The improvement defined by claim 11 including a third disc concentrically mounted in relation to said indicia point, such third disc including means arranged for projecting a cursor line onto the display plate to indicate a predetermined angle of flight of the aircraft to the aimpoint indicated by the indicia point carried by the display plate, operator-operative means to angularly position said third disc so as to vary the angular position of the cursor line projected onto the display plate in relation to the aimpoint indicated by the indicia point carried by the display plate, scale means on the display plate for indicating altitude and bearing distance of the aircraft at the flight position indicated by the beam of light relative to the aimpoint over a first predetermined scale range, means for shifting the operation of the pair of slotted discs by said control means relative to the scale means from the first scale range to a second predetermined scale range upon adjustment of the pair of slotted discs by said control means to a predetermined critical angular relation, and a range change trigger switching means operable by the adjusted angular position of the other of said pair of discs by said control means at said predetermined critical relation to render effective the means for shifting the range of indication by the scale means from the first to the second scale range.

16. For use in an aircraft instrument of a type including a display plate, a control means for receiving signals indicative of a position of the aircraft in flight relative to an aimpoint, and light projecting means including a pair of discs, one of said discs including a radial slot, and the other of said discs including a spiral slot, said pair of slotted discs being operable by said control means so as to position said slots in a cooperative relation to effectively project therethrough onto the display plate in response to said signals a beam of light indicative of the flight position of the aircraft in relation to the aimpoint; the improvement comprising an indicia point carried by the display plate in concentric relation to the slotted discs for indicating the aimpoint on the display plate, a third disc concentrically mounted in relation to said indicia point, such third disc including means arranged for projecting a cursor line onto the display plate to indicate a predetermined angle of flight of the aircraft to the aimpoint indicated by the indicia point carried by the display plate, and operator-operative means to angularly position said third disc so as to vary the angular position of the cursor line projected onto the display plate in relation to the aimpoint indicated by the indicia point carried by the display plate.

17. For use in an aircraft instrument of a type including a display plate, a control means for receiving signals indicative of a position of the aircraft in flight relative to an aimpoint, and light projecting means including a pair of discs, one of said discs including a radial slot, and the other of said discs including a spiral slot, said pair of slotted discs being operable by said control means so as to position said slots in a cooperative relation to effectively project therethrough onto the display plate in response to said signals a beam of light indicative of the flight position of the aircraft in relation to the aimpoint, the improvement comprising an indicia point carried by the display plate for indicating the aimpoint on the display plate, scale means on the display plate for indicating altitude and bearing distance of the aircraft at the flight position indicated by the beam of light relative to the aimpoint over a first predetermined scale range, and means for shifting the operation of said pair of slotted discs by said control means relative to the scale means from the first scale range to a second predetermined scale range so as to prevent adjustment of the pair of slotted discs by said control means to a predetermined critical angular relation.

18. The improvement defined by claim 17 including indicator means operable by the range shifting means to indicate the effective scale range under prevailing flight conditions of the aircraft.

19. The improvement defined by claim 17 including a range change trigger switching means to define said critical angular relation and operable by the adjusted angular position of the other of said pair of discs by said control means to render effective the means for shifting the range of indication by the scale means from the first to the second scale range.

20. The improvement defined by claim 17 including a range change trigger switching means to define said critical angular relation and operable by the adjusted angular position of the other of said pair of discs by said control means to render effective the means for shifting the range of indication by the scale means from the first to the second scale range, indicator means operable by the range shifting means to indicate the effective scale range under prevailing flight conditions of the aircraft.

21. The improvement defined by claim 17 including ambiguity switching means operable by said control means and effective to cause said control means in response to said signals to operate the light projecting means so as to direct the beam of light onto the display plate at one side of the indicia point upon the aircraft in flight proceeding towards the aimpoint and onto the display plate at an opposite side of the indicia point upon the aircraft in flight proceeding past the aimpoint, whereupon the beam of light indicative of the position of the aircraft in flight may be projected onto said display plate at said opposite sides of the indicia point.

22. The improvement defined by claim 17 including means for projecting onto the display plate a line indicative of a predetermined angle of flight of the aircraft to the aimpoint indicated by the indicia point carried by the display plate, and operator-operative means to angularly position said flight line projecting means so as to vary the angular position of the line projected on the display plate in relation to the aimpoint indicated by the indicia point carried by the display plate.

23. The improvement defined by claim 17 including a range change trigger switching means operable by said control means to render effective the means for shifting the operation of said light projecting means by said control means relative to the scale means from the first to the second scale range, an indicator means operable by the range shifting means to indicate the effective scale range under prevailing flight conditions of the aircraft, an ambiguity switching means operable by said control means and effective to cause said control means in response to said signals to operate the light projecting means so as to direct the beam of light onto the display plate at one side of the indicia point upon the aircraft in flight proceeding towards the aimpoint and onto the display plate at an opposite side of the indicia point upon the aircraft in flight proceeding past the aimpoint, whereupon the beam of light indicative of the position of the aircraft in flight may be projected onto said display plate at said opposite sides of the indicia point.

24. The improvement defined by claim 23 including an indicator means operable by the range shifting means to indicate the effective scale range under prevailing flight conditions of the aircraft, ambiguity switching means operable by said control means and effective to cause said control means in response to said signals to operate the light projecting means so as to direct the beam of light onto the display plate at one side of the indicia point upon the aircraft in flight proceeding towards the aimpoint and at an opposite side of the indicia point upon the aircraft in flight proceeding past the aimpoint, whereupon the beam of light indicative of the position of the aircraft in flight may be projected onto said display plate at said opposite sides of the indicia point, and means for projecting onto the display plate a line indicative of a predetermined path of flight of the aircraft to the aimpoint, and operator-operative means to angularly position said line projecting means so as to vary the angular position of the line projected onto the display plate in relation to the aimpoint indicated by the indicia point carried by the display plate.

25. For use in an aircraft instrument of a type including a display plate, a control means for receiving signals indicative of a position of the aircraft in flight relative to an aimpoint, light projecting means including a first pair of discs, one of said first pair of discs including a radial slot, and the other of said first pair of discs including a spiral slot, said first pair of slotted discs being operable by said control means so as to position said slots in cooperative relation to effectively project therethrough onto the display plate in response to said signals a first beam of light to indicate symbolically the flight position of the aircraft in relation to the aimpoint, said light projecting means including a second pair of discs, one of said second pair of discs including a radial slot, and the other of said second pair of discs including a spiral slot, and means to angularly position said second pair of discs in relation one to the other so as to position said slots in a cooperative relation to effectively project therethrough onto the display plate a second beam of light to indicate symbolically a waypoint of the aircraft; the improvement comprising an indicia point carried by the display plate in concentric relation to said first and second pairs of slotted discs, said indicia point indicating the aimpoint on the display plate, and operator-operative means to selectively operate said angular positioning means so as to cause the second beam of light indicative of the waypoint to be projected through the cooperating slots of the second pair of discs onto the display plate a selected offset distance from the aimpoint indicated by the indicia point.

26. The improvement defined by claim 25 including a fifth disc in concentric relation to said first and second pairs of discs, said fifth disc including a radial line thereon, other operator-operative means to angular adjust the fifth disc and thereby the radial line thereon so as to project onto the display plate a cursor line so as to effectively define a desired path of flight of the aircraft in a vertical plane to the aimpoint indicated by the indicia point of the display plate.

27. The improvement defined by claim 25 including scale means on the display plate for indicating altitude and bearing distance of the aircraft at the flight position indicated by the first beam of light relative to the aimpoint over a plurality of selectively effective scale ranges, and means for shifting the operation of said first pair of slotted discs by said control means relative to the scale means from one of said scale ranges to another of said ranges upon adjustment of said first pair of slotted discs by said control means to a predetermined critical relation.

28. The improvement defined by claim 25 including scale means on the display plate for indicating altitude and bearing distance of the aircraft at the flight position indicated by the first beam of light relative to the aimpoint over a plurality of selectively effective scale ranges, and means for shifting the operation of said first pair of slotted discs by said control means relative to the scale means from one of said scale ranges to another of said ranges, and a range change trigger switching means operable by the adjusted angular position of the other of said first pair of discs by said control means to render effective the means for shifting the range of indication by the scale means from the one to the other scale range.

29. The improvement defined by claim 25 including scale means on the display plate for indicating altitude and bearing distance of the aircraft at the flight position indicated by the first beam of light relative to the aimpoint over a plurality of selectively effective scale ranges, means for shifting the operation of said first pair of slotted discs by said control means relative to the scale means from one of said scale ranges to another of said scale ranges upon adjustment of said first pair of slotted discs by said control means to a predetermined critical relation, and means responsive to the selective operation of the angular positioning means by the operator-operative means to render ineffective the means for shifting the range of indication by the scale means from the one to the other scale range upon the selected offset distance of the waypoint being greater than said other scale range.

30. The improvement defined by claim 25 including scale means on the display plate for indicating altitude and bearing distance of the aircraft at the flight position indicated by the first beam of light relative to the aimpoint over a plurality of selectively effective scale ranges, and means for shifting the operation of said first pair of slotted discs by said control means relative to the scale means from one of said scale ranges to another of said scale ranges upon adjustment of said first pair of slotted discs by said control means to a predetermined critical relation, a range change trigger switching means to define said critical relation and operable by the adjusted angular position of the other of said first pair of discs by said control means to render effective the means for shifting the scale range of indication by the scale means from said one to said other scale range, means responsive to the selective operation of the angular positioning means by the operator-operative means to render ineffective the means for shifting the range of indication by the scale means from said one to said other scale range upon the selected offset distance of the waypoint being greater than said other scale range, and means operable by the range shifting means for indicating the effective scale range under prevailing flight conditions of the aircraft.

31. For use with a navigation computer to control flight of a vehicle, a display instrument comprising a display plate bearing an indicia point indicative of an aimpoint of the vehicle in flight, means to project on the display plate a beam of light to show a symbolic relationship of the vehicle in flight to the indicia point indicative of the aimpoint of the vehicle, means to project onto the display plate a cursor line so as to define a desired path of the vehicle in a vertical plane of flight to the aimpoint indicated by the indicia point of the display plate, operator-operative control means to set the navigation computer so as to effect a selected angle for the controlled flight of the vehicle, and means responsive to said control means to selectively position the means to project onto the display plate the cursor line so as to effectively define the desired path of the vehicle in the vertical plane of flight to the aimpoint in a predetermined angular relation, switch means operative in one sense to render the setting of the navigation computer by the operator-operative control means effective, said switch means being alternately operative in another sense to render the setting by the first mentioned operator-operative control means ineffective, second control means rendered effective upon the switch means being operative in said other sense to provide another setting of the navigation computer so as to effect a fixed angle for the controlled flight of the vehicle, and the positioning means being thereupon responsive to said effective second control means to reposition the means to project onto the display plate the cursor line so as to effectively define another predetermined flight path for the vehicle to the aimpoint.

32. The combination defined by claim 31 including other operator-operative means to set the navigation computer so as to effect a preselected altitude for the controlled flight of the vehicle, said navigation computer including means for supplying an output signal upon the preselected altitude of flight of the vehicle being greater than the prevailing altitude of flight of the vehicle, third control means responsive to said output signal upon said switch means being operative in said other sense to render the fixed angle setting of the navigation computer ineffective and to cause said positioning means to reposition the cursor line projecting means so as to project onto the display plate the cursor line at a predetermined neutral angular position so as to provide a warning of a flight altitude of the vehicle less than that of the preselected altitude.

33. For use with a navigation computer to control flight of a vehicle, a display instrument comprising a display plate bearing an indicia point indicative of an aimpoint of the vehicle in flight, means to project on the display plate a beam of light to show a symbolic relationship of the vehicle in flight to the indicia point indicative of the aimpoint of the vehicle, means to project onto the display plate a cursor line so as to define a desired path of the vehicle in a vertical plane of flight to the aimpoint indicated by the indicia point of the display plate, operator-operative control means to set the navigation computer so as to effect a selected angle for the controlled flight of the vehicle, and means responsive to said control means to selectively position the means to project onto the display plate the cursor line so as to effectively define the desired path of the vehicle in the vertical plane of flight to the aimpoint in a predetermined angular relation, other operator-operative means to set the navigation computer so as to effect a preselected altitude for the controlled flight of the vehicle, the navigation computer including means for supplying another output signal upon the prevailing altitude of flight of the vehicle corresponding to the preselected altitude, and a warning device responsive to said last mentioned output signal.

34. For use with a navigation computer to control flight of a vehicle, a display instrument comprising a display plate bearing an indicia point indicative of an aimpoint of the vehicle in flight, means to project on the display plate a beam of light to show a symbolic relationship of the vehicle in flight to the indicia point indicative of the aimpoint of the vehicle, means to project onto the display plate a cursor line so as to define a desired path of the vehicle in a vertical plane of flight to the aimpoint indicated by the indicia point of the display plate, operator-operative control means to set the navigation computer so as to effect a selected angle for the controlled flight of the vehicle, and means responsive to said control means to selectively position the means to project onto the display plate the cursor line so as to effectively define the desired path of the vehicle in the vertical plane of flight to the aimpoint in a predetermined angular relation, switch means operative in one sense to render the setting of the navigation computer by the operator-operative control means effective, said switch means being alternately operative in another sense to render the setting by the first mentioned operator-operative control means ineffective, second control means rendered effective upon the switch means being operative in said other sense to provide another setting of the navigation computer so as to effect a fixed angle for the controlled flight of the vehicle, the positioning means being thereupon responsive to said effective second control means to reposition the means to project onto the display plate the cursor line so as to effectively define another predetermined flight path for the vehicle to the aimpoint, other operator-operative means to set the navigation computer so as to effect a preselected altitude for the controlled flight of the vehicle, said navigation computer including means for supplying an output signal upon the preselected altitude of flight of the vehicle being greater than the prevailing altitude of flight of the vehicle, third control means responsive to said output signal upon said switch means being operative in said other sense to render the fixed angle setting of the navigation computer ineffective and to cause said positioning means to reposition the cursor line projecting means so as to project onto the display plate the cursor line at a predetermined neutral angular position so as to provide a warning of a flight condition of the vehicle below that of the preselected altitude, and the navigation computer supplying another output signal upon the prevailing altitude of flight of the vehicle corresponding to the preselected altitude, and a warning device responsive to said other output signal.

35. For use with a navigation computer for controlling flight of an aircraft, a device comprising an operator-operative control means to set the navigation computer so as to effect the controlled flight of the aircraft to a preselected altitude, a display plate, means to project on the display plate a beam of light to provide a symbolic indication of the aircraft in said controlled flight, the navigation computer providing output signals indicative of the location of the aircraft in flight relative to an aimpoint, means for operatively controlling the light projecting means in response to said flight location signals, another operator-operative control means to set the navigation computer so as to effect a controlled flight of the aircraft at a preselected angle, the navigation computer including another means to supply another output signal upon the preselected altitude being greater than the prevailing altitude of flight of the aircraft, a third control means responsive to said other output signal to render said other operator-operative control means ineffective, and another warning means operatively controlled by said third control means in response to said other output to provide a warning of a prevailing flight condition of the aircraft below that of the preselected altitude.

36. For use with a navigation computer for controlling flight of an aircraft, a device comprising an operator-operative control means to set the navigation computer so as to effect the controlled flight of the aircraft to a preselected altitude, the navigation computer including means to supply an output signal upon the prevailing altitude of flight of the aircraft corresponding to the preselected altitude, warning means responsive to said output signal to provide a warning of a prevailing flight condition of the aircraft at the preselected altitude, a display plate, means to project on the display plate a beam of light to provide a symbolic indication of a position of the aircraft in flight, the navigation computer providing output signals indicative of the position of the aircraft in flight relative to an aimpoint, means for operatively controlling the light projecting means in response to said flight position indicative signals, another operator-operative control means to set the navigation computer so as to effect a controlled flight of the aircraft at a preselected angle, means to project on the display plate a cursor line so as to define a desired path of flight of the aircraft in a vertical plane to the aimpoint, the other operator-operative control means to selectively position the means to project onto the display plate the cursor line so as to effectively define the desired path of the aircraft in the vertical plane of flight to the aimpoint in a predetermined angular relation, the navigation computer including another means to supply another output signal upon the preselected altitude being greater than the prevailing altitude of flight of the aircraft, a third control means being responsive to said other output signal to render said other operator-operative control means ineffective, and said means to project onto the display plate the cursor line effectively serving to provide another warning means operatively controlled by said third control means to provide a warning of a prevailing flight condition of the aircraft below that of the preselected altitude.

37. For use with a navigation computer to control flight of a vehicle, a display instrument comprising a display plate bearing indicia means indicative of an aimpoint of the vehicle in flight, means variably operable to show symbolically on the display plate a position of the vehicle in a vertical plane of flight in relation to the indicia means indicative of the aimpoint of the vehicle, means to show on the display plate a cursor line so as to define a desired path of the vehicle in said vertical plane of flight to the aimpoint indicated by said indicia means of the display plate, control means to set the navigation computer so as to effect a selected angle for the controlled flight of the vehicle, and means responsive to said control means to selectively position the means to show on the display plate the cursor line so as to effectively define the desired path of the vehicle in the vertical plane of flight to the aimpoint in a predetermined angular relation.

38. A display instrument as defined by claim 37 including means to compute flight distance of the vehicle to the aimpoint, and means responsive upon the computed flight distance decreasing below a predetermined value to cause the variably operable means to effect an amplification of the position of the vehicle in flight shown symbolically on the display plate in relation to said indicia means and said cursor line, other indicia means on said display plate cooperatively arranged in relation to the position of the vehicle shown symbolically on the display plate, and said other indicia means being indicative of the altitude and distance of the vehicle in relation to the aimpoint.

39. A display instrument as defined by claim 37 including means to cause the variably operable means to show symbolically on the display plate the position of the vehicle in flight to be effectively shifted from one side of the indicia means indicative of the aimpoint borne by the display plate to the opposite side of said indicia means indicative of said aimpoint upon the vehicle in flight passing the aimpoint of the vehicle indicated by said indicia means.

40. A display instrument as defined by claim 39 including means to compute flight distance of the vehicle to the aimpoint, and means responsive upon the computed flight distance decreasing below a predetermined value to cause the variably operable means to effect an amplification of the position of the vehicle in flight shown symbolically on the display plate in relation to said indicia means and said cursor line, other indicia means on said display plate cooperatively arranged in relation to the position of the vehicle shown symbolically on the display plate, and said other indicia means being indicative of the altitude and distance of the vehicle in relation to the aimpoint.

41. In a display instrument of a type including a display plate bearing first, second and third indicia means, variably operable means for showing on the display plate a symbolic image of a vehicle in a vertical plane of flight in cooperative relation with the first, second and third indicia means; the improvement comprising means to control the variably operable means so as to show on the display plate the symbolic image of the vehicle in a position in said vertical plane of flight corresponding to distance and altitude of the vehicle shown by the symbolic image on the display plate relative to an aimpoint indicated by the first indicia means on the display plate, the second and third indicia means being indicative of the respective distance and altitude of the vehicle shown by the symbolic image on the display plate relative to the aimpoint indicated by the first indicia means, other variably operable means to show on the display plate a cursor line so as to define a desired path of the vehicle in a vertical plane of flight to the aimpoint indicated by the first indicia means of the display plate, indicia borne by the display plate and associated with the second and third indicia means to indicate the distance and altitude of the vehicle shown by the symbolic image on the display plate in relation to both the aimpoint indicated by the first indicia means of the display plate and to the desired path of the vehicle in said vertical plane of flight defined by the cursor line shown by the other variably operable means, and angular indicia borne by the display plate and associated in cooperative relation with the cursor line to indicate the desired angle of flight of the vehicle shown by the symbolic image on the display plate.

* * * * *